United States Patent
Gabin et al.

(10) Patent No.: US 9,621,610 B2
(45) Date of Patent: Apr. 11, 2017

(54) METHODS AND ARRANGEMENTS FOR HTTP MEDIA STREAM DISTRIBUTION

(75) Inventors: Frederic Gabin, Bagnolet (FR); Thorsten Lohmar, Aachen (DE); Clinton Priddle, Indooroopilly (AU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 728 days.

(21) Appl. No.: 13/521,387

(22) PCT Filed: Jan. 18, 2011

(86) PCT No.: PCT/SE2011/050054
§ 371 (c)(1),
(2), (4) Date: Jul. 10, 2012

(87) PCT Pub. No.: WO2011/087449
PCT Pub. Date: Jul. 21, 2011

(65) Prior Publication Data
US 2012/0290644 A1     Nov. 15, 2012

Related U.S. Application Data

(60) Provisional application No. 61/295,830, filed on Jan. 18, 2010, provisional application No. 61/296,104, filed on Jan. 19, 2010.

(51) Int. Cl.
G06F 15/173    (2006.01)
H04L 29/06     (2006.01)
H04L 29/08     (2006.01)

(52) U.S. Cl.
CPC ........ H04L 65/602 (2013.01); H04L 65/4084 (2013.01); H04L 65/4092 (2013.01); H04L 65/608 (2013.01); H04L 67/02 (2013.01)

(58) Field of Classification Search
None
See application file for complete search history.

(56) References Cited

U.S. PATENT DOCUMENTS 6,128,653 A * 10/2000 del Val et al. ................ 709/219
6,910,078 B1 * 6/2005 Raman et al. ................ 709/231
(Continued)

FOREIGN PATENT DOCUMENTS

CN      1584882 A       2/2005
JP   2007-074684 A      3/2007
(Continued)

OTHER PUBLICATIONS

R. Pantos "HTTP Live Streaming", draft-pantos-http-live-streaming-00, May 1, 2009.
(Continued)

*Primary Examiner* — Scott B Christensen
(74) *Attorney, Agent, or Firm* — Myers Bigel, P.A.

(57) ABSTRACT

A method performed by a server of a communication network for making an HTTP media stream accessible to a client is provided. A Media Presentation Description (MPD) is generalized, such that the MPD is provided with at least one period element sequentially arranged according to a media play timeline. Each period element is provided with at least one representation such that at least one of the period elements is provided with at least two alternative representations. Each representation is provided with an ordered sequence of at least one media segment URI. Each media segment URI references at least one media segment of the HTTP media stream. The generated MPD enables a client to select representations and to acquire referenced media segments based on the selected representations.

37 Claims, 11 Drawing Sheets

(56) References Cited

U.S. PATENT DOCUMENTS

| | | | |
|---|---|---|---|
| 8,204,079 B2* | 6/2012 | Gardner et al. | 370/469 |
| 8,205,004 B1* | 6/2012 | Kaufman | H04L 65/607 |
| | | | 375/240 |
| 2003/0236912 A1* | 12/2003 | Klemets et al. | 709/236 |
| 2007/0110074 A1* | 5/2007 | Bradley et al. | 370/395.51 |
| 2009/0259766 A1 | 10/2009 | Karlsson et al. | |
| 2009/0282162 A1 | 11/2009 | Mehrotra et al. | |
| 2009/0307368 A1* | 12/2009 | Sriram et al. | 709/231 |
| 2009/0307602 A1* | 12/2009 | Brewer et al. | 715/744 |
| 2011/0099594 A1* | 4/2011 | Chen et al. | 725/105 |
| 2011/0238789 A1* | 9/2011 | Luby et al. | 709/219 |
| 2012/0110138 A1 | 5/2012 | Zhang | |

FOREIGN PATENT DOCUMENTS

| | | |
|---|---|---|
| JP | 2010-502095 A | 1/2010 |
| JP | 2013-500652 A | 1/2013 |
| JP | 2013-505684 A | 2/2013 |
| JP | 2013-511198 A | 3/2013 |
| JP | 2013-511201 A | 3/2013 |
| KR | 2009-0117672 A | 11/2009 |
| KR | 2011-0053179 A | 5/2011 |
| KR | 2011-0053180 A | 5/2011 |
| WO | WO2009101787 A1 | 8/2009 |
| WO | WO 2011/038032 A2 | 3/2011 |

OTHER PUBLICATIONS

A. Zambelli "IIS Smooth Streaming Technical Overview", Mar. 2009.

PCT Notification of Transmittal of International Preliminary Report on Patentability, mailed Jun. 11, 2012 for PCT International Application No. PCT/SE2011/050054, filed on Jan. 18, 2011.

PCT Written Opinion of the International Preliminary Examining Authority, mailed Feb. 8, 2012 for PCT International Application No. PCT/SE2011/050054, filed on Jan. 18, 2011.

PCT Written Opinion of the International Preliminary Examining Authority, mailed Mar. 30, 2011 for PCT International Application No. PCT/SE2011/050054, filed on Jan. 18, 2011.

PCT International Search Report, mailed Mar. 30, 2011 for PCT International Application No. PCT/SE2011/050054, filed on Jan. 18, 2011.

Response to Written Opinion filed Nov. 15, 2011 for PCT International Application No. PCT/SE2011/050054, filed on Jan. 18, 2011.

Japanese Office Action; Notice of Ground for Rejection Corresponding to Japanese Patent Application No. 2012-548920; Mailing Date: Oct. 14, 2014; 3 Pages.

Chinese Office Action Corresponding to Chinese Patent Application No. 201180006387.6; Date Mailed: Jun. 5, 2014; English Translation Thereof, 3 Pages.

Third Office Action, Chinese Patent Application No. 201180006387.6, Jun. 29, 2016, 7 pages.

* cited by examiner

METHODS AND ARRANGEMENTS FOR HTTP MEDIA STREAM DISTRIBUTION

CROSS-REFERENCE TO RELATED APPLICATION

This application is a 35U.S.C. δ371 national stage application of PCT International Application No. PCT/SE2011/050054, filed on Jan. 18, 2011, which claims priority to U.S. Provisional Application Nos. 61/295,830, filed Jan. 18, 2010 and 61/296,104, filed on Jan. 19, 2010, the entire contents of which are incorporated by reference herein as if set forth in their entirety.

FIELD

The present invention relates to a method for making a HTTP media stream accessible to a client, a method for acquiring a HTTP media stream, and a server and a client for executing the respective methods.

BACKGROUND

HTTP streaming is a method of file based streaming of live or on-demand content between entities, such as e.g. from a server or an intermediate network node to a client. A HTTP streaming enabled client requiring content to be uploaded first acquires a list of small files or segments of files, which together make up a stream for, or a description of, particular, required content by fetching it from a server or any other network node. Such a list is typically referred to as a Media Presentation Description (MPD). In the present context we use the term MPD synonymously also for Playlist and Manifest. A playlist may be described in M3U8 format or as a list provided in XML format.

At each point of time there may be multiple small files, or segments of files, from hereinafter referred to as media segments that can be chosen between by a client. HTTP streaming can either be template based or playlist based. In template based HTTP streaming, requested URLs are described in the MPD using a template, which can e.g. be of the type:
www.server.com/streamfile/$Rep$/$Index$/
where $Rep$ is replaced by a requested representation and $Index$ is replaced by a sequence number, which is used to determine the time at which the media segment is requested.

In playlist based HTTP streaming, each media segment and each time has its own URL, such as e.g.:
Video time 0
->URLs associated with Video time 0
Video time 1
->URLs associated with Video time 1
Video time 2
->URLs associated with Video time 2

Known MPD structures are however very strict, thereby allowing a very small amount of flexibility, especially when it comes to content which is accessible from different content sources and/or content which may have different characteristics over time.

SUMMARY

An object of this document is to address at least some of the problems mentioned above. More specifically, an object is to provide a new structure of an MPD, a method for providing such an MPD, a method for acquiring and processing an MPD such that downloading of a HTTP media stream can be executed in a more flexible way, including providing alternatives for a client requesting a media stream downloading.

According to a first aspect, a method to be performed by a server of a communication network for making a HTTP media stream accessible to a client is provided. When applying the method a MPD is generated, such that it is provided with at least one period element, sequentially arranged according to a media play timeline; such that each period element is provided with at least one representation and such that at least one of the at least one period element is provided with at least two alternative representations, wherein each representation is provided with an ordered sequence of at least one media segment URI, wherein each media segment URI is referencing at least one media segment of the HTTP media stream.

The MPD is then provided such that the client can acquire it; select, on the basis of the content of the MPD, for at least one period element, a representation, and acquire, for each selected representation, the respective referenced media segments.

The suggested MPD arrangement simplifies referencing to alternative media segments, and especially to media segments origination from different sources.

The generating step may comprise a step of arranging at least one of the ordered sequences of at least one media segment URI, such that it is provided as at least one representation and described in a template format.

Alternatively or in combination with providing one or more representations in a template format, the generating step may comprise a step of arranging at least one of the representations, such that it is provided as an ordered sequence of at least two media segment URIs and described in a playlist format.

Furthermore, each representation associated with the same period element may be provided with a first attribute, which may alternatively be referred to as a first representation attribute, having a setting which is representative of the media segments referenced in the representation, such that a client will be able to select a representation of a respective period element on the basis of the respective setting.

A period element may also be provided with a second attribute, or representation attribute, wherein a setting of the second representation attribute is selected such that it is common for all media segments associated with the respective period element, and such that it is representative of all representations associated with this period element.

If a more hierarchical structure is required, a respective second representation attribute may be provided in each representation of a respective period element, such that the second representation attribute is described on a representation level, or in a respective period element such that the second representation attribute is described on a period element level.

Alternatively, a hierarchical structure may be developed even further, such that during the generating step at least one period element of the MPD is provided with at least two alternative period constructions, where each period construction is provided with at least two representations, and a second representation attribute and, where a setting of the second representation attribute is selected such that it is representative of the respective period construction, in a way such that the client will be able to select representation of the period element on the basis of one or more of said representation attributes.

A representation attributes applied in an MPD may e.g. define a codec, a bit rate, a resolution or a language, thereby enabling for a service provider to provide one or more selectable alternatives which may rely on either user device capabilities, user preferences or environmental conditions, or a combination thereof.

In addition to providing a more flexible MPD, such an MPD may also be updated by adding at least one representation to, by removing at least one representation from, or by modifying at least one representation of the MPD.

According to one embodiment, where updating of an MPD is based on polling, the MPD may be provide with an indication of a poll interval, such that a client having acquired an MPD will be able to poll for MPD updates at an interval determined by the indication, while according to another alternative, updated MPDs may instead be pushed to the client.

In order to enable a client to determine the latest available media segment, the MPD may also be provided with a description of a mapping of the media play timeline of the HTTP transport stream with a reference such as e.g. a server time line or a wall clock time.

Media segments of different representations of the same period element are preferably arranged, such that they are time aligned at the start of the period element.

According to another aspect, a method performed by a client of a communication network for obtaining a HTTP media stream from at least one network node of the communication network is provided. According to this method the client acquires an MPD comprising at least one period element, sequentially arranged according to a media play timeline one of the network nodes, wherein each period element comprise at least one representation and wherein at least one of the at least one period element comprise at least two alternative representations, each representation comprising an ordered sequence of at least one media segment URI, wherein each media segment URI is referencing at least one media segment of the HTTP media stream. Once in possession of an MPD, the client can select a representation for at least one of the period elements, on the basis of content of the MPD, and acquire referenced media segments for each selected representation.

A respective representation may be selected on the basis of one or more representation attributes of the respective period element, where each representation is having a respective setting representative of the respective representation or period element.

In order to be able to base a selection of a representation on environmental changes, the bit rate which is available for transmitting the HTTP media stream from said at least one network node to the client may be estimated, and the client may select a representation of at least one period element on the basis of such an estimation, by considering at least one bit rate dependent representation attribute.

According to yet another aspect, a server which is capable of making a HTTP media stream accessible to a client is provided which comprises a generating unit configured to generate aMPD configured as described above, a providing unit configured to make the MPD accessible to a client, such that the client can acquire the MPD; to select a representation for at least one period element on the basis of the content of the MPD, and to acquire the respective referenced media segments for each selected representation.

The generating unit may be configured to provide the MPD with at least one representation described in a template format, a playlist format, or a combination of both.

In addition, the generating unit may be configured to provide the MPD, for each media segment URI, with an indication of the duration of the respective referenced one or more media segments.

The generating unit may also be configured to provide each representation associated with the same period element with a representation attribute and a respective representation attribute setting, such that the representations are selectable by the client on the basis of the representation attribute.

The generating unit may be configured to provide representation attributes of at least two different categories, and to provide the representation attributes in a hierarchical manner, such that in case a respective representation attribute is provided at a period level, it is valid for all representations of a respective period element, while in case it is provided at a representation level it is only valid for the respective representation of a respective period element.

The generating unit may be configured to update the MPD, by adding at least one representation by removing at least one representation from, or by modifying at least one representation of the Media Presentation Description.

According to another aspect a client of a communication network, capable of acquiring a HTTP media stream from at least one network node of the communication network, is provided. The client comprises a requesting unit configured to acquire a MPD arranged as indicated above, from one of said at least one network node, and a selecting unit configured to select each respective representation, on the basis of the MPD content.

The selecting unit is typically configured to select a respective representation on the basis of at least one representation attribute of the representation.

The client may also be provided with an estimating unit which is configured to estimate a bit rate available for transmitting the HTTP media stream from the at least one network node to the client, such that the selecting unit will be able to select a representation of at least one period element on the basis of the estimation, by considering at least one bit rate dependent representation attribute.

BRIEF DESCRIPTION OF THE DRAWINGS

The objects, advantages and effects, as well as features of the invention, will be more readily understood from the following detailed description of exemplary embodiments of the invention when read together with the accompanying drawings, in which.

DETAILED DESCRIPTION

While the present document covers various alternative embodiments of the methods and arrangements as described below with reference to the disclosed figures, it is to be understood that the specific description and figures are not intended to limit the scope of the invention to the specific forms disclosed. On the contrary, the scope of the claimed invention is to be seen as including all modifications and alternative constructions thereof falling within the spirit and scope of the invention as expressed in the appended claims.

Figure 1:
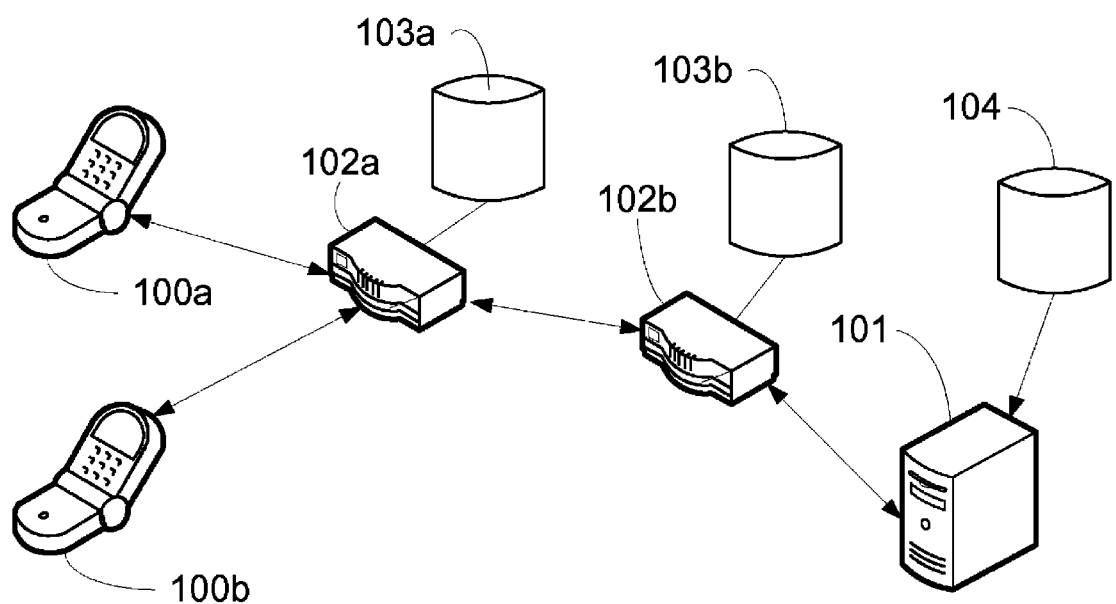
FIG. 1 is illustrating a simplified overview of a communication network which is suitable for HTTP media stream distribution.

This document refers to a new, more flexible MPD structure which is suitable for use in association with HTTP streaming. FIG. 1 is an illustration of a simplified system architecture which is suitable for enabling adaptive HTTP steaming between servers and clients including distribution of MPDs. FIG. 1 comprise two clients 100a,100b, which may be referred to as HTTP streaming clients, each of which may initiate a respective streaming service to a user for obtaining a structured set of data, typically referred to as a media presentation, by downloading relevant metadata which is describing the media presentation and associated the media presentation in the form of media segments. Downloading of metadata and the associated media presentation may be executed either directly from a server 101, which may be referred to as a HTTP streaming server, or from an intermediate network node, here represented by cache 102a and cache 102b, which both may keep a copy of media segments and its associated metadata. In the described embodiment each cache 102a, 102b, is attached to a respective HTTP Proxy 103a, 103b.

The metadata mentioned above is typically referred to as a MPD, a manifest, or a list. In the present context, such a list it commonly referred to as a playlist, which is typically but not necessarily provided as an XML structured document.

Below principles of a more flexible MPD construction applicable for HTTP streaming will be described. By applying the suggested MPD, clients will be able to request uploading of media content in a simple and more flexible way, especially when the requested media presentation have characteristics which differ over time. More specifically, a flexible MPD structure which can carry metadata describing alternative options, here referred to as alternative representations, to a client is suggested. The alternative representations may be provided as template and/or playlist style structures, which will require minimal changes to original approaches.

The proposed new MPD structure is especially applicable for an adaptive HTTP streaming scenario, where a continuous media flow is subdivided into media segments for delivery through a HTTP caching hierarchy, such as the one described above.

On the server side of the network, the server creates a continuous segment or file stream out of a continuous byte stream provided from a media source 104, where new media segments may be continuously uploaded to the server 101. In addition to providing a flexible MPD to requesting clients, the server 101 may also update an MPD with new URI's for new media segments, by modifying or removing URI's from the MPD, or by adding URI's to the MPD. According to the present invention, such an MPD updating procedure may even be performed during an ongoing uploading procedure of a media presentation.

The suggested MPD structure is a construction out of period definitions, where a media presentation is described in a sequence of one or more periods, where each period is provided with a description of a period, or time range or interval of media play time. Such a description, forming part of the MPD may also be referred to as a period element. The MPD can also be described as a construction out of representation definitions, where each representation is provided such that it describes an ordered list of one or more media segments, which contain media data and/or metadata for decoding and presentation of associated media content. Different representations associated with the same period element represent different alternatives of media content, where each representation is distinguishable by at least one representation attribute.

Associated representations of consecutive period elements are identifiable by a specific representation attribute which has been set to a common setting will together form a specific track or channel. By providing a period element with two or more alternative representations, each of which is identifiable by one or more representation attribute, a client having acquired an MPD will, on the basis of the respective settings of one or more representation attribute, for each period element, be able to select one of the alternative representations, such that, for each period element, the most suitable media segments can be acquired, by fetching them from the respective source. More specifically, a client may at any time choose to switch from one channel or track to another and then remain on the selected track until changes of circumstances, such as e.g. environmental changes or user preferences, makes another alternative track more favorable or preferable.

Each media segment accessible by a client is uniquely referenced by a media segment URI included in the MPD, where each media segment URI may either have been created implicitly through a template, or explicitly as a list, such as e.g. a playlist.

Figure 2:
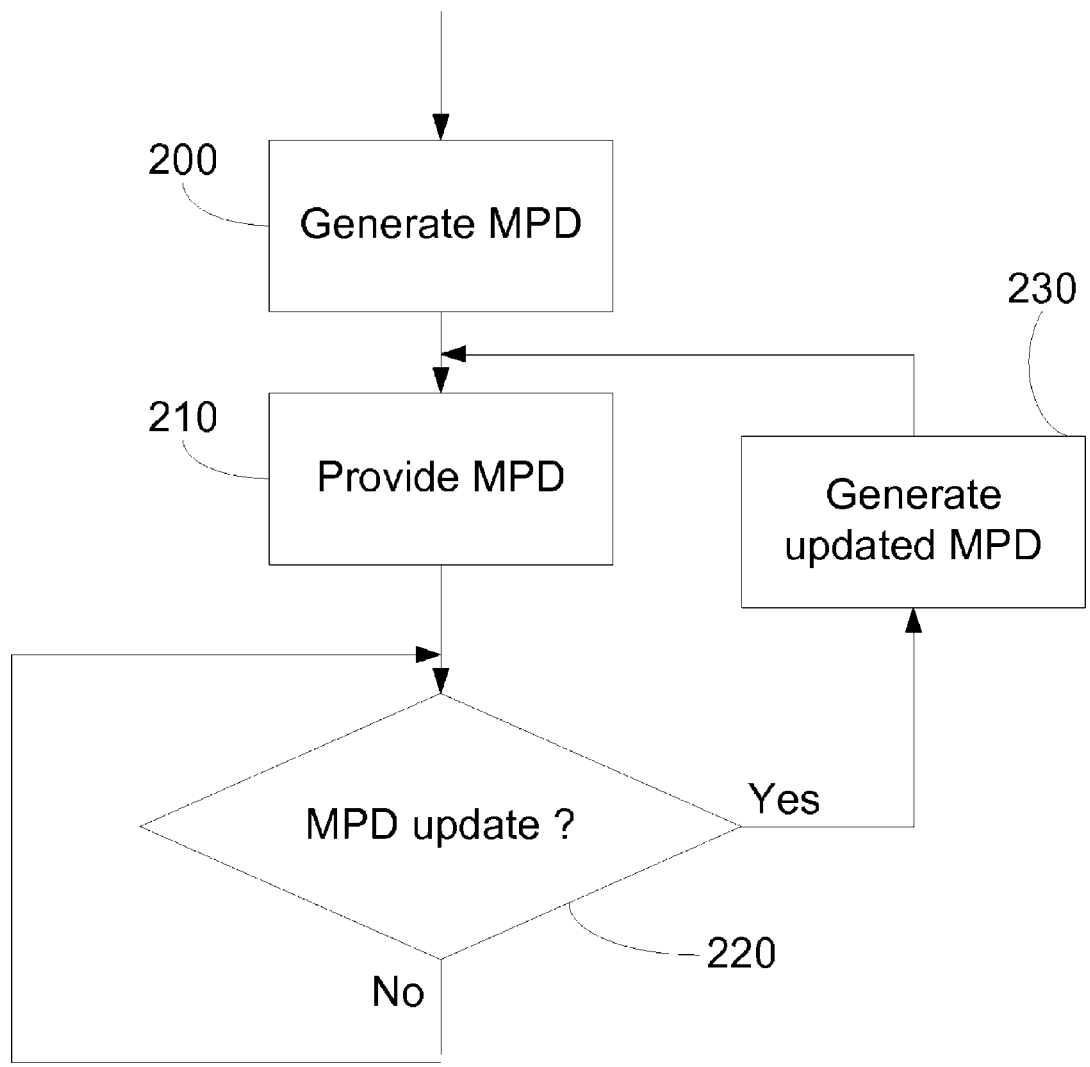
FIG. 2 is a flow chart illustrating a method for generating and providing an MPD at a network node.

FIG. 2 is a simplified flow chart, illustrating a method executable by a server for providing an MPD. In a first step 200 an MPD is generated by applying a template approach, a playlist approach or a combination thereof following principles discussed above such that required alternatives are provided for each period of a media presentation to be described in the MPD, and in a subsequent step, 210, the generated MPD is provided by the server, such that it is made accessible to clients, typically by storing the MPD in a storage means arranged at the server or operatively connected to the server, or by transmitting the MPD to an intermediate node, such as a cache, from which a client may request the MPD. The latter step may be referred to as a step of providing the MPD, as indicated in FIG. 2.

A content provider distributing media content via a server may require an MPD associated with the distributed media content to be updatable, in particular during live sessions. Additional representations may thereby become available, or already available representations may be removed or modified. A content provider may e.g. decide to provide a higher quality representation during a live session, or to increase flexibility of insertion of advertisements into a media stream presented via the MPD.

As indicated in another step 220, the MPD may therefore be updated by way of addition, deletion or modification of a period element at any time subsequent to the generating of a first MPD in step 200. In case it is determined in step 220 that any MPD updating is required, an updated MPD is generated accordingly in a subsequent step 230 and the updated MPD is provided by the server in step 210, such that it is made accessible to the clients. In the latter case, step 210 may e.g. comprise pushing of the updated MPD to one or more clients. However, only periods at the start of the media play time described in an MPD, or at the end of the MPD may be added, deleted or modified.

The generating steps 200 and 230 of FIG. 2 will now according to one embodiment be described in further detail with reference to FIG. 3. Starting with a first period element of a media presentation, as indicated in a first step 300, a first representation is provided for the first period element, as indicated in a subsequent step 310, or more specifically, an instruction describing a first representation is provided. The latter step includes providing the representation with a representation attribute having a setting which is representative of the representation, and is repeated until all required representation attributes have been set accordingly for the representation. The latter step also includes providing each representation with relevant media segment URIs. Which alternative representations, and optionally also alternative period constructions, to apply when generating an MPD may, as indicated above, depend on various circumstances. A representation attribute may be set such that it defines e.g. alternative languages, bitrates, codecs, resolutions, or any other criteria which should be selectable by a client.

In a next step 320, it is determined whether another representation is to be provided into the MPD for the relevant period element, or if the provided representation was the last representation for the period element. In the former case the process continues by providing another representation to the period element, as indicated with step 330 followed by step 310, while in the latter case, it is determined, in a subsequent step 340, whether the period element under construction is to comprise another period construction, i.e. another set of one or more representations, in addition to the set generated in steps 330 and 310, which is to be provided into the MPD as further selectable alternatives. If another period construction is relevant for the period element under construction, a new period construction is initiated in step 350, and relevant representations and representation attributes are selected and generated in step 330 and 310.

In case of an MPD update, step 310 may also include providing of instructions associated with such MPD updates. Typically such information is provided at a period level. In addition, a description of a mapping of the media play timeline of the HTTP transport stream described by the MPD with any of a server time line or a wall clock time, or any other time reference, may also be provided into the MPD in step 310. When providing the representations in step 310, the media segments of the respective representations are typically provided such that they are time aligned at the start of the respective period element.

In case of different period constructions, at least one representation attribute is set, such that it distinguishes the two period constructions from each other, while at least one other representation attribute is set such that it distinguishes a representation of the period construction from at least one other representation. If different hierarchical levels are applied, each representation attribute is provided at the required hierarchical level.

Once a period element is ready it is determined, in a subsequent step 360, if there are any more period elements for which one or more representations is to be defined. If this is the case, a next period element is provided in step 370, continuing with the steps already described above, until all period elements of the next period element have been included into the MPD. When all period elements of the MPD have been defined and arranged accordingly, the generating procedure is terminated, as indicated with a final step 380.

Typically any representation attributes, which are common to all representations of a respective period element are included into the MPD is steps 300 and 370 respectively. In a corresponding way any representation attributes common to period constructions of a respective period element are included into the MPD in step 350.

Once the MPD has been constructed accordingly and made accessible to the clients, any of these clients will be able to access the MPD, and on the basis of the content of the MPD, i.e. the instructions provided into the MPD, a client will be able to select a track, such that relevant media fragments can be acquired. From the clients perspective, once the MPD has been processed accordingly, the procedure for accessing media segments on the basis of content of the MPD may however be executed according to a plurality of known prior art solutions, which are out of the scope of this document.

Figure 4:
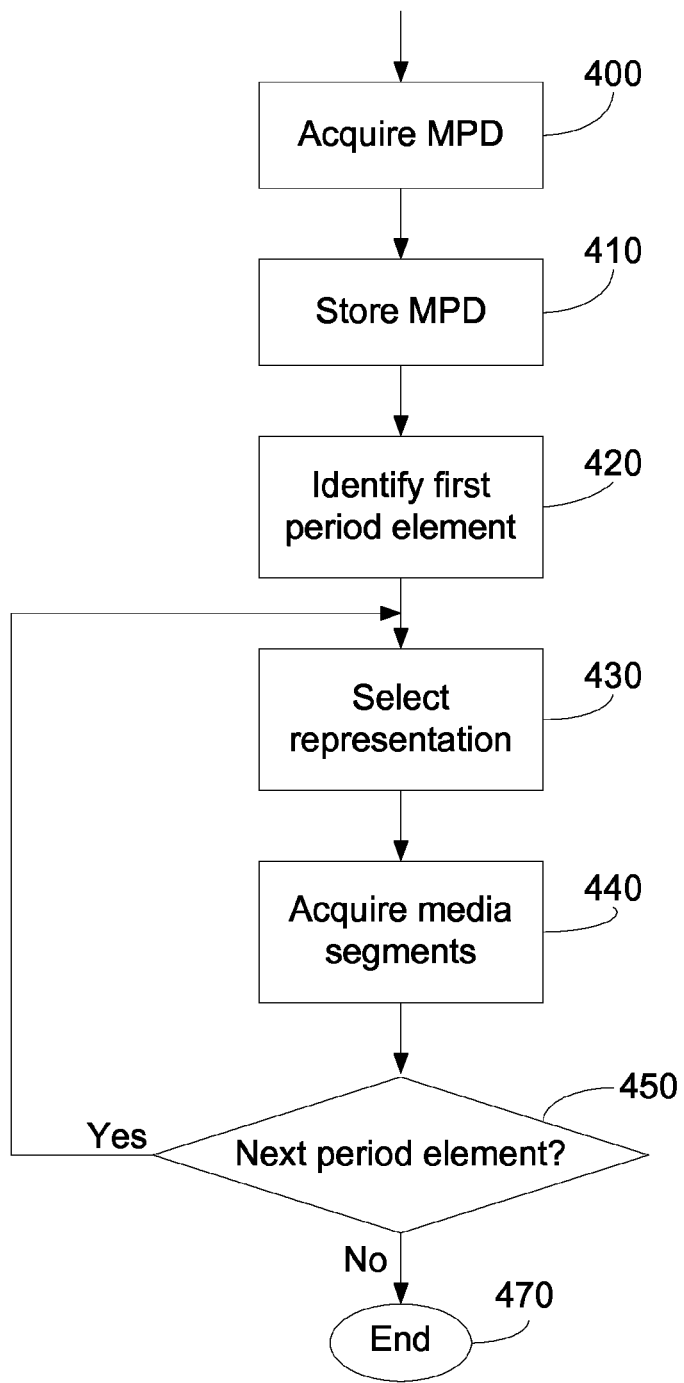
FIG. 4 is yet another flow chart illustrating a method for acquiring an MPD from a network node.

FIG. 4 is another flow chart, illustrating a method executable at a client for enabling for the client to acquire a required media presentation in the form of media content, selectable as alternative options presented in an MPD. In a first step 400 of FIG. 4 a MPD associated with a requested media presentation is acquired from a network node, such as e.g. a server, or an intermediate cache, and in a subsequent step 410, the MPD is stored, typically in a conventional storage means at the client or at a unit operatively connected to the client. It is to be understood that how to find the MPD which is associated with a required media presentation is commonly known to the person skilled in the art, and is therefore out of the scope of this document.

At the client, content of the MPD, provided in the form of period descriptions contained in respective period elements, are identifiable period by period, starting from the first period element which is associated with a requested part of a media presentation, as indicated with another step 420.

In case of downloading of an On-Demand media presentation the first period element will be the initial period element of the respective MPD, while in case of a downloading of a live session the first period element, will be the first identifiable period element of the MPD, i.e. the first period element from which the downloading can be executed.

In a subsequent step 430 the content of the MPD which is representative for the relevant period element, including instructions specific for each representation, as well as instructions relevant for all representations, or a group of representations represented in a period construction, is interrogated such that, at least party on the basis of these instructions a representation can be selected for the respective period element. Such a selection of a representation, as well as switching between different representations may be based on one or more criteria, as already mentioned above. In addition the MPD may also comprise additional instructions which are representation independent, such as e.g. instructions on how to obtain updated MPDs.

In order not to waste radio resources, a client should only fetch one representation from a respective period, and while an encoding choice, such as e.g. bit rate, may be switched relatively frequently from period element to period element, e.g. based on changing environmental conditions, other choices, such as e.g. an audio track represented by a certain language, should not be downloading changed based on link bit rate estimations or any other quality based estimation, since a change of language would lead to a very bad quality of experience, due to repeated switching between different languages which are encoded at different media bit rates.

Typically the client behavior applicable for capability dependant representation attributes, such as e.g. different display resolutions, can be described similarly, such that media content distributed to the client may be available in different resolutions, such as e.g. QVGA and VGA. Typically, a client selects the best suitable resolution based on terminal preferences and/or user preferences, before acquired media content is being rendered, and maintains the selected resolution during the complete downloading. Alternatively, the client has the option to change resolution during a downloading, e.g. because of experiencing a too bad connectivity. If e.g. a selected audio track is not available during all periods of play time, the client may be configured to instead select e.g. a default language, or the first available language.

Selection of representation and/or period construction may also be based on measurements or estimates, such as an estimated available bit rate, which is typically executed by the client on a continuous basis. In case of performing an estimate of the bit rate representations of different quality may typically be selected on the basis of such estimates.

Once a representation has been selected the relevant media segments can be fetched from its source according to the respective instructions of the MDP, as indicated in step 440. In a next step 450 it is determined if any further period element is relevant for acquiring the required media presentation, and if so, representations of a next period element are considered and selected in step 430 after which the process is continued by acquiring media segments associated with the selected representation, according to step 440.

If more than one period construction has been defined for a specific period element, also representations of such an alternative period construction will be considered in step 430, such that one representation of one of the period constructions of the respective period element is selected. When no more period element is relevant for the downloading i.e. the complete media presentation as required by the client has been downloaded, the described process is terminated, as indicated in step 470.

Figure 5:
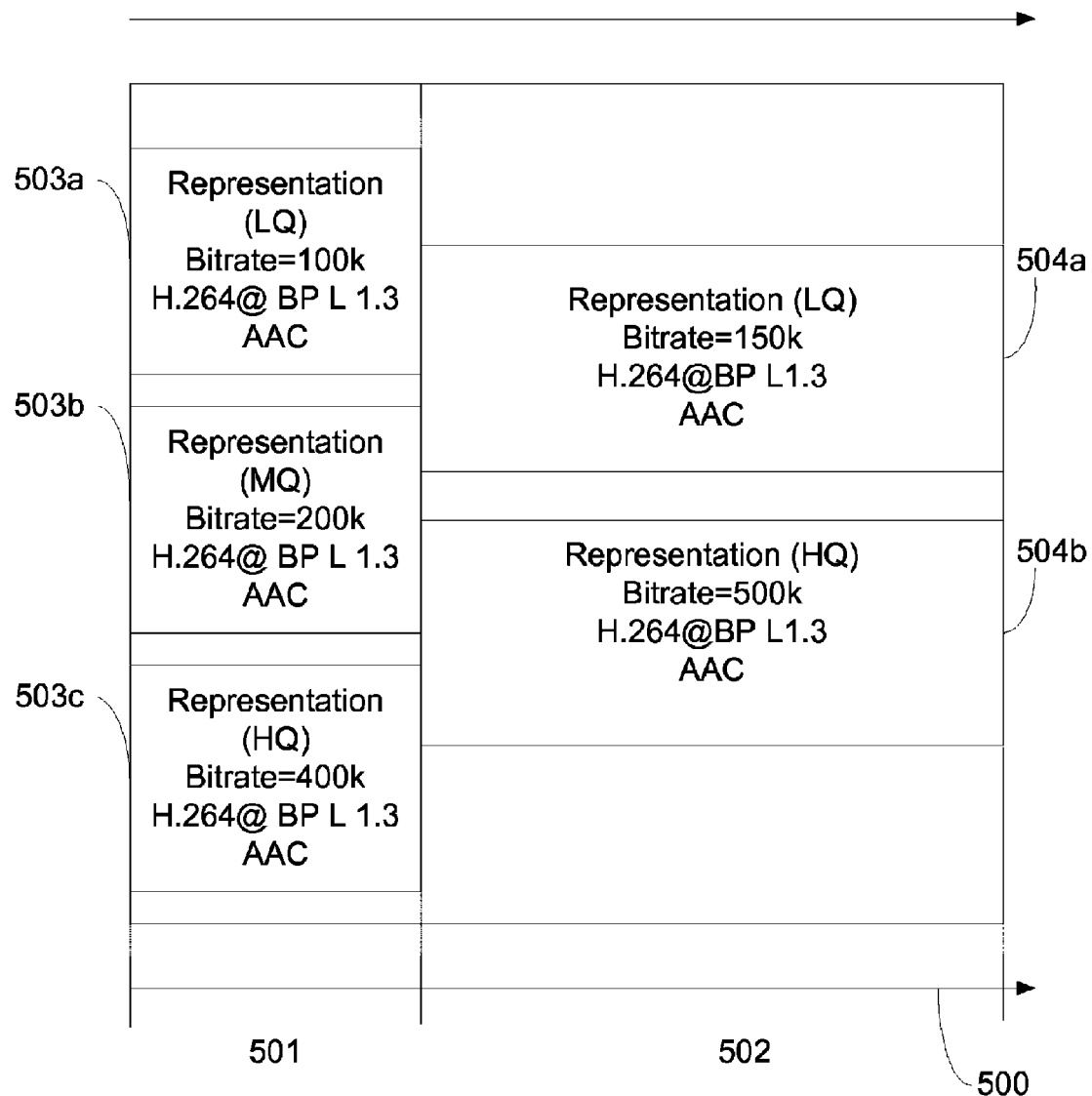
FIG. 5 is an illustration of an MPD arranged according to one embodiment.

Some basic principles of the MPD structure or construction suggested above will now be described below with reference to FIG. 5. As indicated in FIG. 5, a single media play timeline 500, which is described through the MPD, is subdivided into one or more periods of play time, such that the play timeline 500 is define by the concatenation of the timeline of each period, or period element, which is described by the MPD. The MPD comprises a sequence of one or more period elements, here illustrated as two period elements 501,502, where each period element comprises one or more alternative descriptions of the same media content, here referred to as representations, or representation elements, of the media content of a described media presentation or media stream. Alternatively, the MPD may comprise one media time line per media component, such that separate timelines with synchronization points for e.g. audio and video can be applied.

In FIG. 5 the first period element 501 comprise three different representations 503*a*,503*b*,503*c*, which are here representative of, and distinguishable by, different representation attributes, here represented by bit rate attributes, namely a Low quality (LQ) attribute which is representative of a bit rate of 100 kbps, a Medium Quality (MQ) attribute representative of 200 kbps, and a High Quality (HQ) attribute representative of 400 kbps, respectively, while the second period element 502 only comprise two alternative representations 504*a*, 504*b*, providing a LQ option of 150 kbps and a HQ option of 500 kbps. Media segments of several representations described for the same period are typically time aligned at the start of a period element. The MPD of FIG. 5 is thus constructed such that all instructions are arranged in a respective representation, or representation element, i.e. by considering the content of a representation, all instructions valid for that representation will be available to the client.

Each representation of a period element describes the same content but one or more representation attributes, where one or more of these properties may differ from one representation to the other, if selectable options are to be provided to a client.

Generally, the same content may be available with different representations, identifiable via one or more representation attributes, each of which may define alternative choices for the client. If instead no options are to be available for the client when it comes to a respective representation attribute for a respective period element, this attribute can be provided with the same setting for all representations of the period element. As indicated in FIG. 5, video and audio properties, here defined by respective representation attributes set to H.264 @ Baseline Profile Level 1.3 and AAC audio, respectively, have been defined as common representation attributes which are valid for all representations of the two shown period elements, i.e. these properties are not selectable by the client, but are supposed to be applied by the client for all, or at least the two periods shown in FIG. 5.

While representations which are representative of different media qualities may typically be selectable based on some environmental aspect, such as e.g. an available bit rate, representations having different languages are instead normally selectable on the basis of either a users preferences, such as e.g. preferences to acquire the requested content in a specific preferred language, or on the basis of content offering, such as e.g. the requested content is only available in an English version. In the latter case, language is thus typically selected and maintained for subsequent periods irrespective of any possible environmental changes which may be recognized by a client. The same considerations apply for representations which are defined for different resolutions, which are typically dependent on the type of display of the user device, and which will typically not change during an uploading of a media presentation.

According to another embodiment, the MPD can be generated, or constructed, in a hierarchical description structure enabling a representation attribute which is common for all representations to be placed on a higher hierarchical level, the period element level, or period level of the MPD, while representation attributes which differ between alternative representations of a period element, i.e. which are to be valid for a respective representation only, are provided on a lower hierarchical level of the MPD, here referred to as a representation level. As will be further described below, further levels, such as e.g. an intermediate period construction level, may also be applied in such a hierarchical structure.

Figure 6:
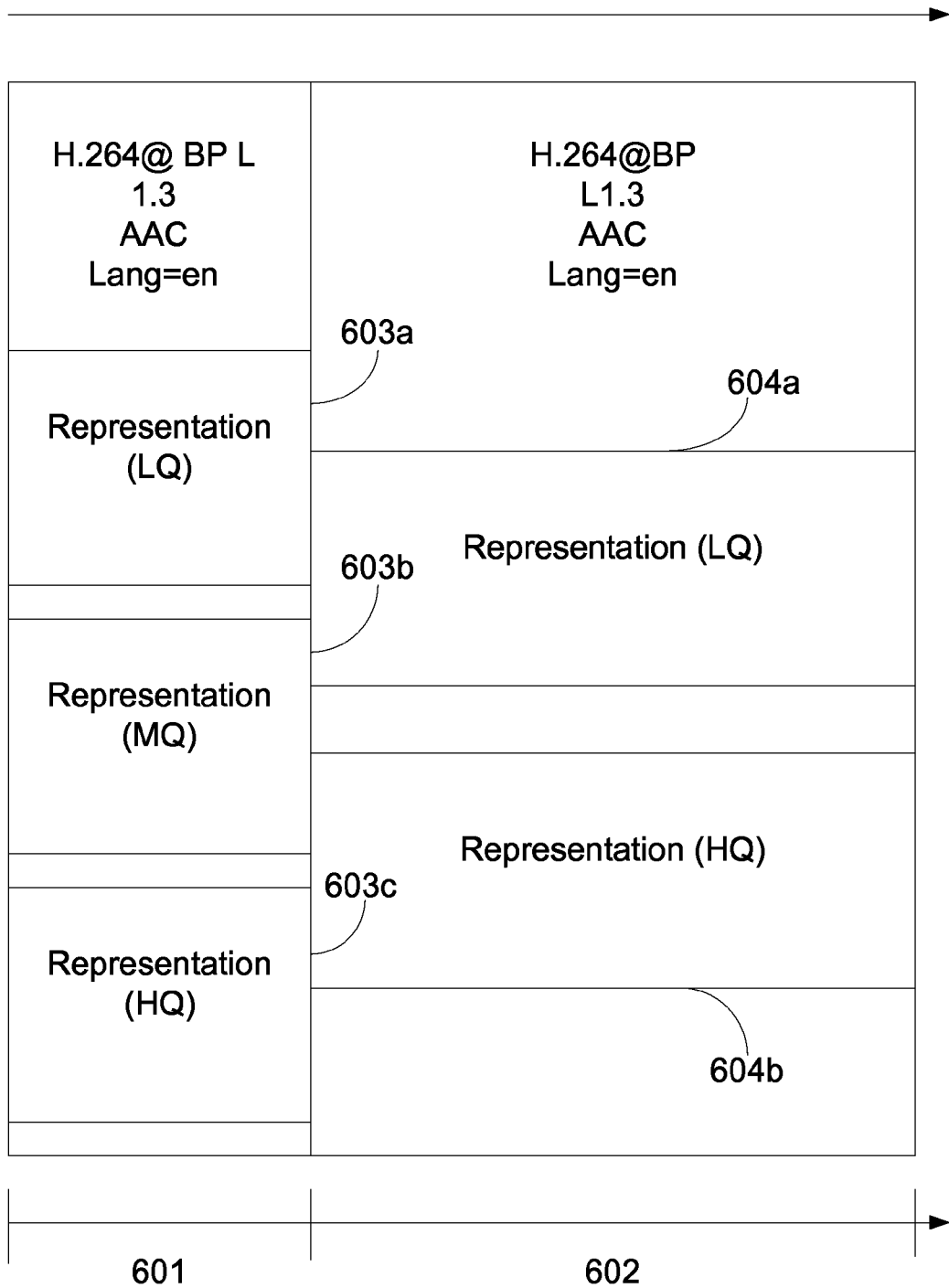
FIG. 6 is an illustration of an MPD arranged according to another embodiment.

FIG. 6 illustrates such an alternative hierarchically arranged structure, were all the video and audio related representation attributes described in the MPD of FIG. 5, except the bit rate, are defined commonly on a period level for each respective period 601,602. In resemblance to the embodiment of FIG. 2, each representation element, here represented by the three representations 603a,603b,603c for period 601 and the two representations 604a,604b, for period 602, are provided as bit rate dependent alternative representations, which may be identifiable e.g. by their bit rate attributes, set to LQ, MQ, HQ, respectively, for the representations of period 601 and LQ,MQ, respectively for the representations of period 602, i.e. the bit rate attributes are defined on a representation level.

Figure 7:
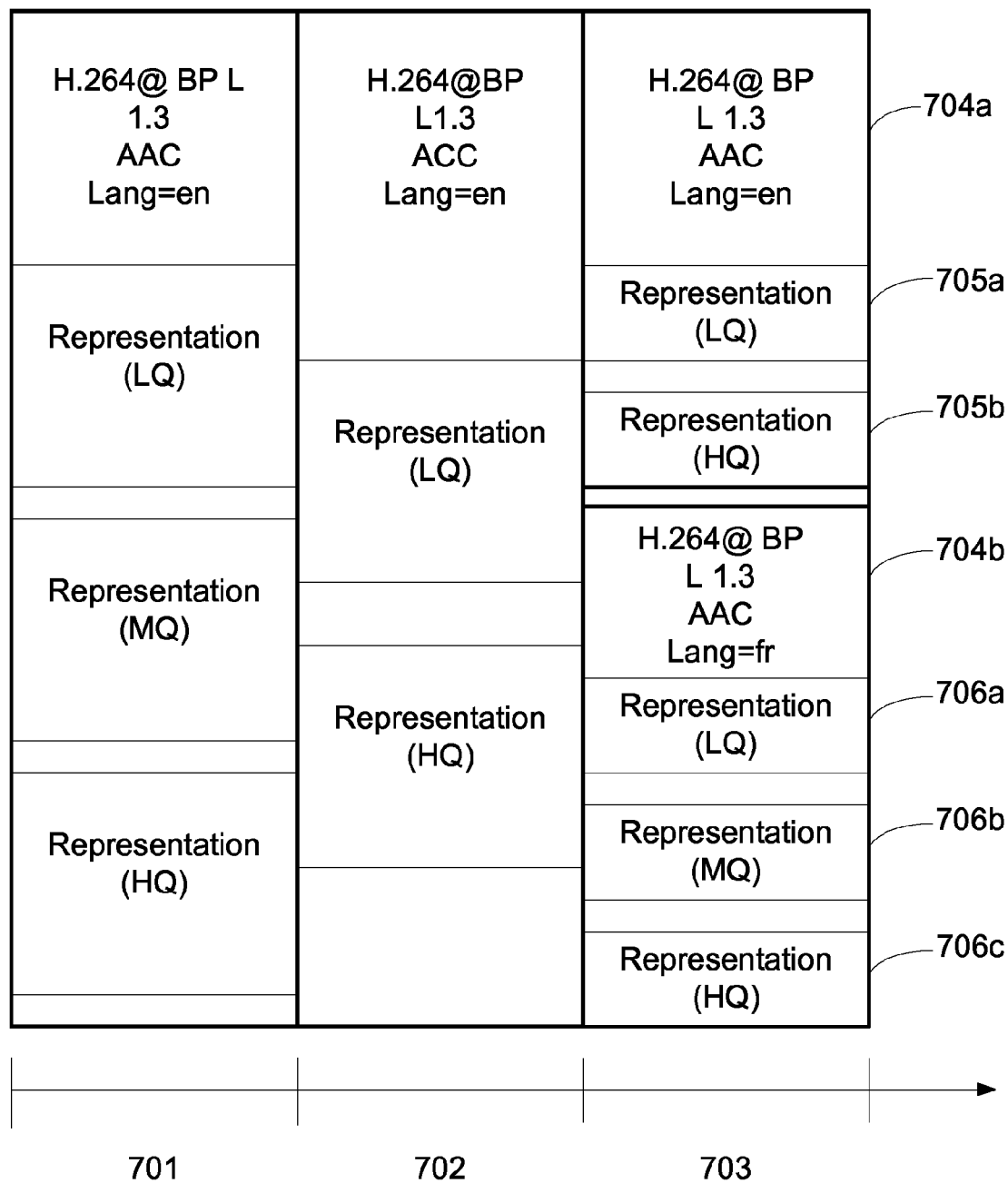
FIG. 7 is an illustration of an MPD arranged according to yet another embodiment.

Alternatively, more than one attribute may be made selectable by a client, for one or more period element of a MPD. FIG. 7 describes such an alternative hierarchical MPD structure according to another embodiment, where a first and the second period 701,702 correspond to the respective first and second period of FIG. 6. However, in a third period 703, the period element comprises two different groups of representations, from hereinafter referred to as alternative period constructions, 704a, 704b, forming yet another hierarchical level which is above the representation level but below the period level. By introducing alternative period constructions, selectable representations may be arranged into different groups, thereby enabling a client to easily select a respective representation on the basis of more than one selection criteria.

In the present example period construction 704a comprises a language based representation group, having a common language attribute (Lang) set to English (en), while for alternative period construction 704b the corresponding representation group has a common language attribute (Lang) set to French (Fr). The first period construction 704a comprises two alternative representations 705a, 705b, describing two different bitrates LQ and HQ respectively, while the second period construction 704b comprises three alternative representations, 706a, 706b, 706c describing the three different bit rates LQ, MQ and HQ. Thereby, a client having selected a preferred language i.e. one of the period constructions 704a, 704b will also select a preferred quality from the selected period construction and, consequently, fetch different media segments, depending on which of these available options that is selected. As indicated in the figure, the remaining given representation attributes for the respective period constructions are given on a period level and are, thus, non-selectable options which are common for the media segments of all three periods.

There are different ways to describe a sequence of URI's, referencing a respective sequence of media segments of a respective representation in the MPD. For the embodiments described above, the respective media segments may be described either by applying a template approach, or the media segments may be explicitly described by a list, typically a playlist. Alternatively, a combination of the both approaches may be applied.

When a template approach is applied, the respective media segments shall contain the same media duration per segment of a reference track, i.e. a representation represented by a specific representation attribute, so that the client can derive a normal media play time of the content. A range of valid indexes specifying information, such as e.g. a start and duration of a respective period of a media presentation, is therefore defined for each template.

A sequence of media segment URI's, here described by one URL, described as a template, may e.g. be defined as follows:

```
<representation
    RequestURL=http://www.example.com/content/example.3gp/R1
    /$Segmentnumber$
    Bandwidth="200000"
    SegmentNumberStart="11"
    SegmentDuration="10"
/>
```

Here an index identified as, $SegmentNumber$, is used in the MPD to identify a respective segment number. The template described above comprises a bandwidth specific representation attribute, which has been set to 200 kbps. In addition, the valid index range of the described media segment sequence is here described through the start of a respective representation by "SegmentNumberStart", here set to segment number 11, and the duration by "SegmentDuration", here set to a segment duration of 10 s, i.e. each segment which can be acquired from the cited request URL has a duration which is 10 s long.

If instead a playlist approach is used for description of a sequence of URIs, referencing media segments, each referenced media segment may contain media data of different durations. An example of a sequence of media segment URIs associated with one representation described as a playlist is given below.

```
<representation
    Bandwidth="200000"
    <segment dur="20s"
RequestURL=http://www.example.com/content/example.3gp/R1/Clips11>
    <segment dur="21s"
RequestURL=http://www.example.com/content/example.3gp/R1/Clips12>
    <segment dur="19s"
RequestURL=http://www.example.com/content/example.3gp/R1/Clips13>
    <segment dur="19s"
RequestURL=http://www.example.com/content/example.3gp/R1/Clips14>
    <segment dur="21s"
RequestURL=http://www.example.com/content/example.3gp/R1/Clips15>
</representation >
```

An index defining the media duration of a media segment, here indicated as "segment dur", is preferably given for each media segment, thereby enabling for a client to calculate a normal media play time line from the received segments. As indicated in the given playlist example, the exact duration is described in seconds.

Another example of a hierarchically arranged MPD which is standard-template based, i.e. without any playlist, which is also describing one period with two alternative representations is shown below:

```
<?xml version="1.0" encoding="UTF-8"?>
<mpd xmlns=urn:3GPP:metadata:2009:PSS:HTTPStreaming"
    Type="On demand"
    Duration="240s" >
<Period Start="0" Duration="240s">
    <representation
RequestURL=http://www.example.com/content/example.3gp/R1/
$SegmentNumber$
    Bandwidth="200000"
    Language="en"
    Width="320" Height="240"
    SegmentDuration="10s"
/>
<representation
RequestURL=http://www.example.com/content/example.3gp/R2/
$SegmentNumber$
    Bandwidth="400000"
    Language="en"
```

-continued

```
      Width="320" Height="240"
      SegmentDuration="5s"
    />
  </period>
</mpd>
```

Obviously the template above describes a session which is 240 s long, having a single period of the same length. It comprises two different representations, having english (en) as a common language presented on a representation level, but where these representations are distinguishable by different bandwidth attributes in the two representations. For the given period, some representation attributes which are common for both representations, such as e.g. xml version, which is set to 1.0 and encoding, which is set to UTF-8, are inserted into the MPD on a period level.

A playlist style MPD has a similar structure compared to the template based one described above with the difference that the playlist style MPD include multiple period elements. An example of such a playlist style MPD, without any templates, which comprises three periods, follows below.

```
<?xml version="1.0" encoding="UTF-8"?>
<mpd xmlns="urn:3GPP:metadata:2009:PSS:HTTPStreaming"
    Type="OnDemand"
    Duration="240s" >
<Period Start="0">
    <representation
      RequestURL="http://www.example.com/content/example.3gp/R1/1"
      Bandwidth="200000"
      Language="en"
      Width="320" Height="240"
    />
    <representation
      RequestURL="http://www.example.com/content/example.3gp/R2/1"
      Bandwidth="400000"
      Language="en"
      Width="320" Height="240"
    />
</Period>
<Period Start="10s">
    <representation
      RequestURL="http://www.example.com/content/example.3gp/R1/2"
      Bandwidth="200000"
      Language="en"
      Width="320" Height="240"
    />
    <representation
      RequestURL="http://www.example.com/content/example.3gp/R2/2"
      Bandwidth="400000"
      Language="en"
      Width="320" Height="240"
    />
</Period>
<Period Start="20s">
    <representation
      RequestURL="http://www.example.com/content/example.3gp/R1/3"
      Bandwidth="200000"
      Language="en"
      Width="320" Height="240"
    />
    <representation
      RequestURL="http://www.example.com/content/example.3gp/R2/3"
      Bandwidth="400000"
      Language="en"
      Width="320" Height="240"
    />
</Period>
```

The MPD described above is provided with representations having a bandwidth attribute which enables selection of a preferred bandwidth for each period, while other representation attributes indicated in the beginning of the playlist are common for all periods and representations. For each period, a client makes a single request using the described URL and plays out each period sequentially.

According to yet another embodiment given below, an MPD may instead be configured as a combination of playlists and templates. Such a configuration enables reception of content which is downloadable from multiple sources. In the given example, a playlist links three template presentations, having "period start" 0, 110 and 120, respectively. Such an MPD may e.g. be suitable for describing a TV program which has been split in two with an advertisement in the middle. A client may make requests for the first and the third period similarly to the example above, where suitable representations may be chosen, while in the second period, only a single representation is available and the client will be able to make a request to a different server to access that representation.

```
<?xml version="1.0" encoding="UTF-8"?>
<mpd xmlns="urn:3GPP:metadata:2009:PSS:HTTPStreaming"
    Type="OnDemand"
    Duration="240s" >
  <Period Start="0" Duration="110s">
    <representation
      RequestURL="http://www.example.com/content/example.3gp/R1/
      $SegmentNumber$"
      Bandwidth="200000"
      Language="en"
      Width="320" Height="240"
      SegmentDuration="10s"
    />
    <representation
      RequestURL="http://www.example.com/content/example.3gp/R2/
      $SegmentNumber$"
      Bandwidth="400000"
      Language="en"
      Width="320" Height="240"
      SegmentDuration="5s"
    />
  </Period>
  <Period Start="110" Duration="10s">
    <representation
      RequestURL="http://www.example2.com/content/example.3gp/
      $SegmentNumber$"
      Bandwidth="200000"
      Language="en"
      Width="320" Height="240"
      SegmentDuration="5s"
    />
  </Period>
  <Period Start="120" Duration="120s">
    <representation
      RequestURL="http://www.example.com/content/example.3gp/R1/
      $Segmen$SegmentNumber$"
      Bandwidth="200000"
      Language="en"
      Width="320" Height="240"
      SegmentNumberStart="11"
      SegmentDuration="10s"
    />
    <representation
      RequestURL="http://www.example.com/content/example.3gp/R2/
      $SegmentNumber$"
      Bandwidth="400000"
      Language="en"
      Width="320" Height="240"
      SegmentNumberStart="22"
      SegmentDuration="5s"
    />
  </Period>
</mpd>
```

As can be seen above, there may be a lot of correlation among channels or tracks, i.e. alternative ways of selecting and switching between different alternative representations. For example, all channels except one may be provided in English, or even the URL describing different representations may be common until even the last characters.

According to one embodiment, a representation attribute, such as e.g. a language attribute may be applied on all levels in a hierarchical structure, such that the language is defined for an entire sub-tree in question, unless it is overridden.

Another approach is to allow for an extension element, here referred to as RequestURLExtension element, to be defined on a representation level, while a requestURL can be described on the period element level where e.g.
RequestURL=http://www.example.com/content/example.3gp
and where this URL of the period element level is extended at the representation level by e.g.
RequestURLExtension="R2/$SegmentNumber$ In the example given above, for a client to make a request, the client generates the RequestURL of the content by concatenating "RequestURL=http://www.example.com/content/example.3gp" and "R2/$SegmentNumber$" to make:
http://www.example.com/content/example.3gp R2/$SegmentNumber$
so as to select the respective representation.

Below another example of representation attributes, which are described in a hierarchical manner, is given where video content size and language attributes are indicated at the period level in the first and second periods, and hence these both alternatives are valid for all representations of these periods.

In the third period the video content size and bandwidth attributes are instead indicated at the higher period level, and hence these representation attributes are valid for all representations of this period, while the language, which is different for each representation of the third period, is indicated as a language attribute on the representation level.

```
<?xml version="1.0" encoding="UTF-8"?>
<mpd xmlns="urn:3GPP:metadata:2009:PSS:HTTPStreaming"
    Type="OnDemand"
    Duration="240s"
    RequestURL="http://www.example.com/content/example.3gp">
<Period Start="0" Duration="110s" Width="320" Height="240" Language="en">
    <representation
        RequestURLExtension="R1/$SegmentNumber$"
        Bandwidth="200000"
        SegmentDuration="10s"
    />
    <representation
        RequestURLExtension="R2/$SegmentNumber$"
        Bandwidth="400000"
        SegmentDuration="5s"
    />
</Period>
<Period Start="110" Duration="10s" Language="en" Width="320" Height="240">
    <representation
RequestURL="http://www.example2.com/content/example.3gp/$SegmentNumber$"
        Bandwidth="200000"
        SegmentDuration="5s"
    />
</Period>
<Period Start="120" Duration="120s"
Bandwidth="200000" Language="en" Width="320" Height="240">
    <representation
RequestURL="http://www.example.com/content/example.3gp/R1/$SegmentNumber$"
        SegmentNumberStart="11"
        SegmentDuration="10s"
    />
<Period Start="120" Duration="120s"
```

-continued

```
Bandwidth="200000" Language="fr"Width="320" Height="240">
    <representation
RequestURL="http://www.example.com/content/example.3gp/R2/$SegmentNumber$"
        SegmentNumberStart="11"
        SegmentDuration="10s"
    />
</Period>
</mpd>
```

According to another embodiment, where the representation attributes are also described in a hierarchical manner, the period elements describe the duration, incl. the start media play time, for which the media segment URIs are described. The representation element encapsulates all URIs for a single stream property, e.g. a first track of Media Segments for a 200 kbps stream and a second track of media segments for a 400 kbps stream.

In the MPD presented below a first period is described using a template based construction, while a second period is described using a playlist construction. As already mentioned above the content durations for the media segments described by the playlist construction are different for the different representations.

During the first period, the media segments contain 10 seconds of media data for the 200 kbps quality level and 5 sec of media data for the 400 kbps quality level. Each Media segment do however contains exactly the same media duration.

During the second period, the duration of the media segments varies. For the LQ representation, having a bandwidth attribute set to 200 kbps, media segments contain 20 seconds of media data on average, while for the HQ version media segments, i.e. segments for which the bandwidth attribute is set to 400 kbps media segments contain only 10 seconds on average.

```
<?xml version="1.0" encoding="UTF-8"?>
<mpd xmlns="urn:3GPP:metadata:2009:PSS:HTTPStreaming"
    Type="OnDemand"
    Duration="240s"
    RequestURL="http://www.example.com/content/example.3gp/">
<Period Start="0" Duration="110s" Width="320" Height="240" Language="en">
    <representation
        RequestURLExtension="R1/$SegmentNumber$"
        Bandwidth="200000"
        SegmentDuration="10s"
    />
    <representation
        RequestURLExtension="R2/$SegmentNumber$"
        Bandwidth="400000"
        SegmentDuration="5s"
    />
<Period Start="110" Duration="100s" Width="320" Height="240">
    <representation
        Bandwidth="200000"
        <segment dur="20s"
RequestURL="http://www.example.com/content/example.3gp/R1/Clips25">
        <segment dur="21s"
RequestURL="http://www.example.com/content/example.3gp/R1/Clips26">
        <segment dur="19s"
RequestURL="http://www.example.com/content/example.3gp/R1/Clips27">
        <segment dur="19s"
RequestURL="http://www.example.com/content/example.3gp/R1/Clips28">
        <segment dur="21s"
RequestURL="http://www.example.com/content/example.3gp/R1/
```

```
Clips29">
    </representation >
    <representation
        Bandwidth="400000"
        <segment dur="10s"
RequestURL="http://www.example.com/content/example.3gp/R2/
Clips40">
        <segment dur="10s"
RequestURL="http://www.example.com/content/example.3gp/R2/
Clips41">
        <segment dur="9s"
RequestURL="http://www.example.com/content/example.3gp/R2/
Clips42">
        <segment dur="11s"
RequestURL="http://www.example.com/content/example.3gp/R2/
Clips43">
        <segment dur="12s"
RequestURL="http://www.example.com/content/example.3gp/R2/
Clips44">
        <segment dur="8s"
RequestURL="http://www.example.com/content/example.3gp/R2/
Clips45">
        <segment dur="10s"
RequestURL="http://www.example.com/content/example.3gp/R2/
Clips46">
        <segment dur="8s"
RequestURL="http://www.example.com/content/example.3gp/R2/
Clips47">
        <segment dur="10s"
RequestURL="http://www.example.com/content/example.3gp/R2/
Clips48">
        <segment dur="12s"
RequestURL="http://www.example.com/content/example.3gp/R2/
Clips49">
    </representation >
    </Period>
</mpd>
```

Figure 8A:
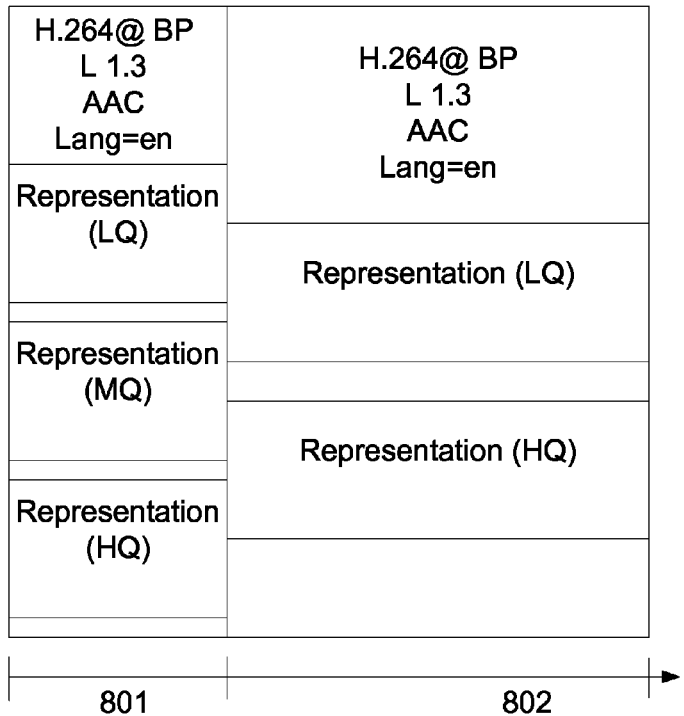
FIG. 8a and 8b are figures illustrating a first MPD and an updated version of the first MPD, respectively.
Figure 8B:
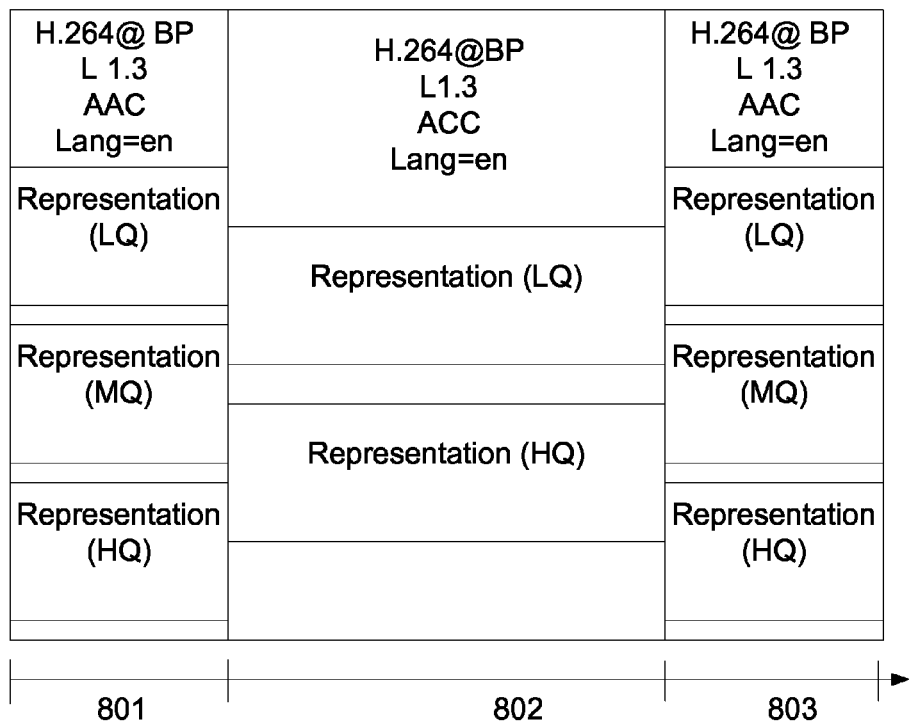

An MPD may be updated whenever required. FIGS. 8a and 8b are simplified illustrations where FIG. 8a is an illustration of an old MPD comprising two period elements 801, 802 with respective representations, while FIG. 6b is an illustration of an updated MPD, which has been provided with an additional period element 803, comprising three alternative representations in a third period, added to the end of the media play time line. During updating, the latest period description must be modified such that it describes the valid range of media URIs. Also the template construction may be changed due to an addition of a new representation. As indicated in FIGS. 8a and 8b, the instructions of periods 801 and 802 are identical in the old and the updated MPD.

Even if no updating of the MPD is applied, support for live cases may be possible. Any live transmission which has a well-defined end can be described through an associated MPD, if the client is time synchronized with the server, at least to a rough precision. In such a situation the MPD may be configured to describe also a mapping of a respective media play timeline with a time of the server or a wall clock time, such as e.g. the NTP (Network Time Period).

To exemplify, an MPD may define that a media play time starts at 1605 h CET. When the client has been time synchronized with a certain precision, the client will be able to determine the latest available media segment, or the media segment which is currently under construction at the client.

Time shifting will depend on the live case. When the terminal has a sufficiently precise understanding of the "latest available media segment", the time shift buffer may be described in "normal media play time" or in "number of segments". Other methods, such as describing a time shift buffer through a wall-click time may also be possible.

For the event of MPD updates which may be made available from a server, two different approaches for enabling a client to become aware of MPD updates will now be described below.

According to a first embodiment a client is configured to perform frequent polling for new MPD updates from a server or from a cache or any other intermediate network node. The poll interval is typically given in the MPD description but may alternatively be pre-defined. MPD files are typically much smaller than media segments and, as a consequence, much easier to handle by HTTP caches than media segments. Conventional caching hierarchies are also typically optimized to handle a steadily increasing number of small documents, and, thus, also updated MPDs.

According to another embodiment, the client is instead configured to apply a push notification approach, where the client is notified about an MPD update by a server, typically by receiving a notification sent in-band together with associated media segments. The new MPD may be provided by a server in a Multipart MIME container, together with associated media segments. Intermediate caches may handle such multipart MIME containers in the same way as any other types of files are handled. If the client is in time shift mode, the client will typically be configured to poll for MPD updates before initiating any seek operation.

A server which is configured to provide an MPD having a structure according to any of the embodiments described above will now be described in further detail below with reference to the simplified block scheme of FIG. 9. The server 900 comprises a generating unit 910 which is configured to generate, for each period of a play time line, the relevant representations, and optionally also alternative period constructions, for a respective media presentation provided as input data to the server 900 from any type of conventional media source (not shown) via a first communication unit 920, such that the selectable representation attributes, associated with respective representations, are made available as selectable options to a client.

The generating unit 910 is typically also configured to update the MPD whenever required according to the procedures described above. Another unit, here referred to as a providing unit 930 of the server 900, is configured to provide the MPD such that it is made accessible to a requesting client. According to one embodiment, the providing unit 930 may therefore be configured to store the MPD in any type of storing means, such that a client having access to the server 900 can request and acquire the MPD from the storing means via a communication unit, here represented by a second communication unit 940. Here such storing functionality is provided by a storing unit 950, which may be based on any type of conventional storing functionality. Alternatively, the providing unit 930 may be configured to transmit an MPD to an intermediate network node, such as e.g. a cache, via the second communication unit 940, thereby enabling for a client to acquire the MPD from the intermediate node whenever required.

As mentioned above, the server 900 may also be configured to update an MPD previously generated by and stored at the server 900. If such an updating option is to be applied, the generating unit 910 will also be provided with suitable updating functionality, which may enable addition of one or more representation to an existing period element of the MPD, addition of a new period element, to remove one or more representations from a period element and/or to modify one or more representations accordingly. Instructions to modify the MPD may be provided to the generating unit 910 via any type of User Interface (UI), here represented by UI 960. The media play time described by the MPD is unbounded to "the future". When a content provider wants to add one or more new representation of an existing period element, or a new period element, it may control the server 900 such that a new period description is added to the end of the media play time line, remaining any previous period elements unchanged.

In a corresponding way, a client, such as e.g. a mobile telephone, a Set Top Box, a laptop or a PC, suitable for implementation in any type of user device which is capable of rendering a media presentation, and capable of requesting an MPD and associated media segments from a network node, such as e.g. a server or a cache, will now be described in further detail below with reference to the simplified block scheme of FIG. 10.

The client 1000 comprises a requesting unit 1010 which is configured to request and acquire an MPD and associated media segments from a network node via a communication unit 1020, typically on the basis of a command entered via a user interface (UI), here represented by UI 1030, which may be any type of conventional UI. If the client 1000 is also configured to poll for updated MPD's, as mentioned as a possible option above, the requesting unit 1010 may also be configured to execute such a polling, typically according to a polling interval previously acquired from an MPD. Polling mechanisms as such are commonly known to the person skilled in the art and is thus out of the scope of this document.

The client 1000 also comprises a storing unit 1040, which may be configured on the basis of any type of available storing technique, being connected to the requesting unit 1010, such that once received by the requesting unit 1010 via the communication unit 1020 an MPD is stored and thus made accessible to the client 1000 for media presentation purposes. The client 1000 also comprises a selecting unit 1050 which is configured to select representations and/or period constructions according to one or more selection criteria that may be applicable for a respective period element. The selecting unit 1050 may receive options, such as e.g. a preferred language selected by a user, via the UI 1030, which input is then used by the selecting unit 1050 to select a relevant period construction or representation for a respective period element.

In order to provide the best possible quality of experience for an end-user, the client 1000 may be configured to adaptively adjust the media quality of a media presentation by switching between representations according to the available link bit rate or any other quality related estimate. In order to provide for such an option, the client 1000 may be provided also with a unit configured to estimate an appropriate parameter, typically on a continuous basis, and to select the best suited, implementation specific, representation on the basis of the estimate. Here such functionality is provided by an estimating unit 1060. The estimating unit 1060 may typically be configured to switch from one alternative representation to an alternative representation when the estimated bit rate exceeds or is lower that a bit rate represented by a presently selected representation with a pre-defined margin.

Alternatively, or in addition to the input provided from the UI 1030, the selecting unit 1050 may therefore be configured to make a decision on the basis of input data provided from the estimating unit 1060, only or in combination with input from UI 1030. Furthermore, the selecting unit 1050 may be configured to consider pre-defined, stored settings or preferences in combination with the possible input data described above or as prioritized settings. By way of example, the display of the user device on which the client resides may be pre-defined and prioritized over other alternatives.

Figure 10:
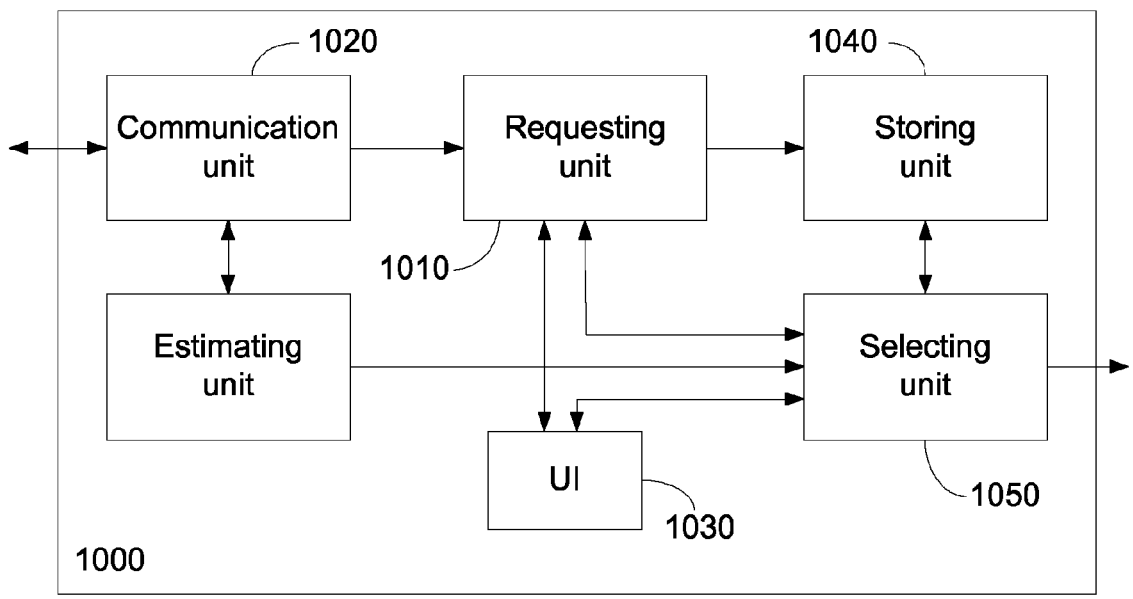
FIG. 10 is a simplified block scheme of a client configured to acquire and process an MPD according to one embodiment.

The selecting unit 1050 of FIG. 10 is also operatively connected to the requesting unit 1010 such that it can instruct the requesting unit 1010 to request the selected media segments from one or more respective network nodes according to the respective ordered list of URI of a selected representation.

The communication unit 1020 is typically also provided with functionality for enabling synchronization with the server, typically on the basis of synchronization information obtained from the MPD.

Once a selection of a representation has been executed by the selecting unit 1050 and corresponding media segments have been requested by the requesting unit 1010, the relevant media segments are typically received by communication means of the client or by the device on which the client 1000 resides, where the media segments are buffered such that they can be rendered in a conventional manner. Also processes for acquiring and processing media segments are well known to the person skilled in the art and will thus not be discussed in any further detail in this document.

Figure 9:
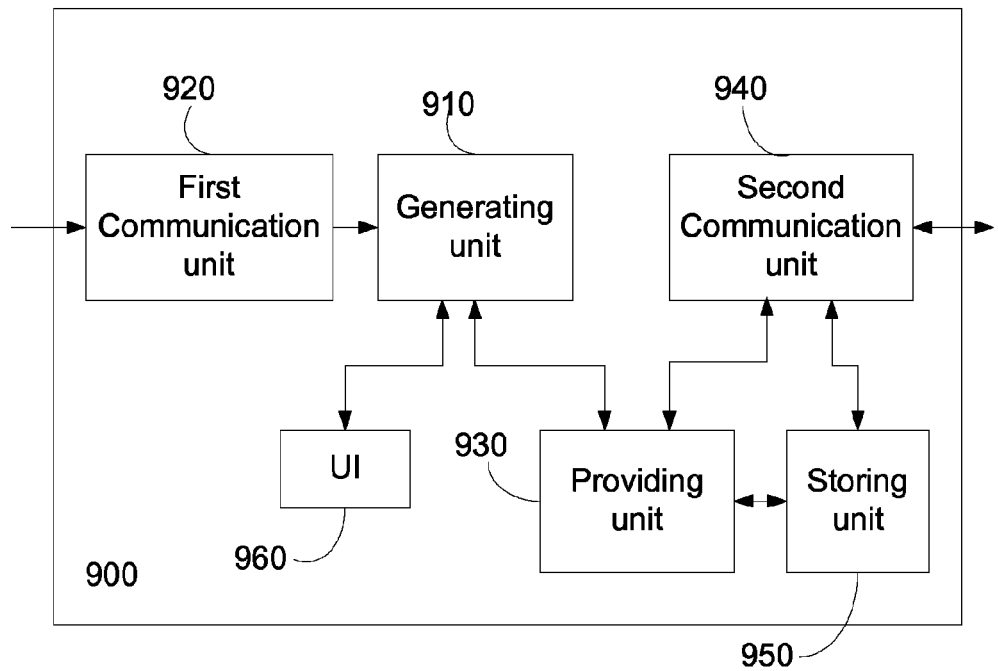
FIG. 9 is a simplified block scheme of a server configured to provide an MPD according to one embodiment.

It is to be understood that both the server of FIG. 9 and the client of FIG. 10 represent simplified configurations, where entities which may typically be comprised in a normal server or client, respectively, but which are not essential for the understanding of the handling of MPDs as suggested in this document have been omitted for simplicity purposes. In addition, it is to be understood that the units presented in these figures are only to be seen as one possible configuration, and that other functional units, as well as other combinations of functional may be applicable, as long as the described functionality is executable following the general principles described above.

The server, as well as the client described above, may be implemented as a respective hardware based solution, a software based solution or as a combination thereof. In the former case the respective units described in FIGS. 9 and 10 respectively may be realized in the form of a respective Application Specific Integrated Circuit (ASIC) configuration.

Figure 11:
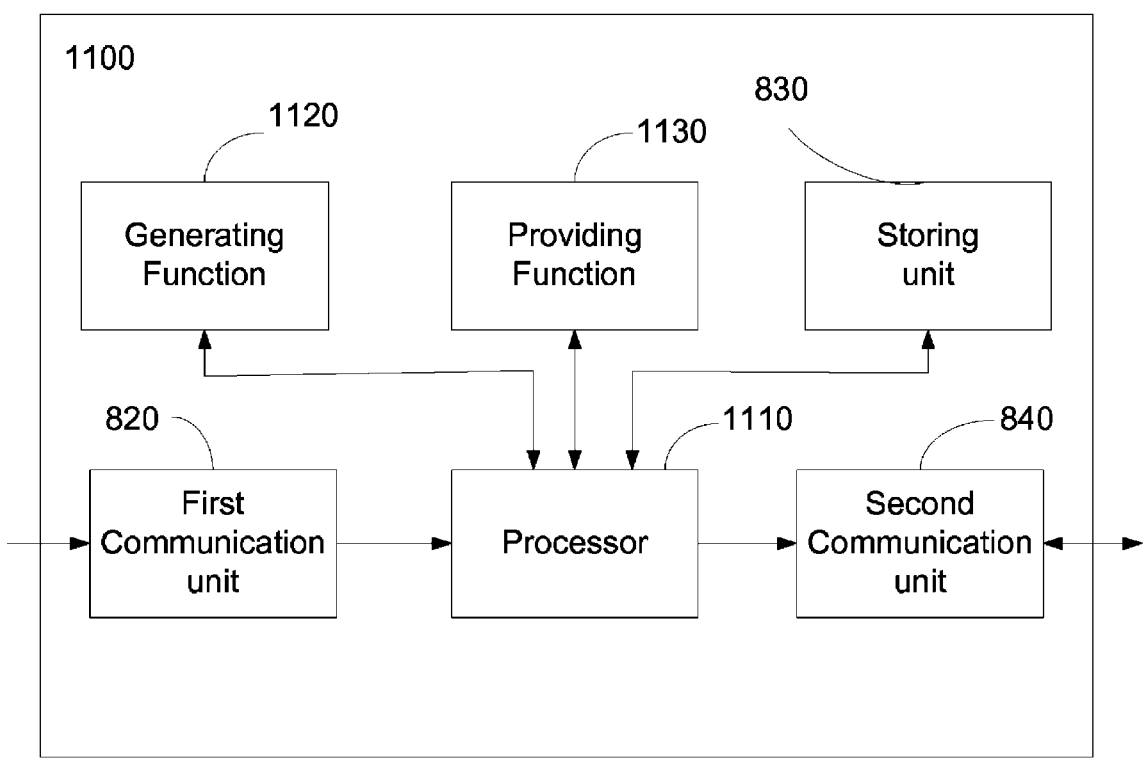
FIG. 11 is a simplified illustration of a server configuration according to another embodiment.

A server 1100 configured as a software based solution will now be described with reference to FIG. 11, where a processor 1110 is connected to a storing unit 830, a first communication unit 820 and a second communication unit 840 and configured to control the server functionality on the basis of instructions maintained in the storing unit 830. More specifically, the processor 1110 is configured to control a generating function 1120 which is configured to generate MPDs by realizing functionality which corresponds to the functionality of generating unit 810 of FIG. 8, and a providing function 1130, which is configured to provide generated MPDs by realizing functionality which corresponds to toe functionality of the providing unit 930 of FIG. 8.

Figure 12:
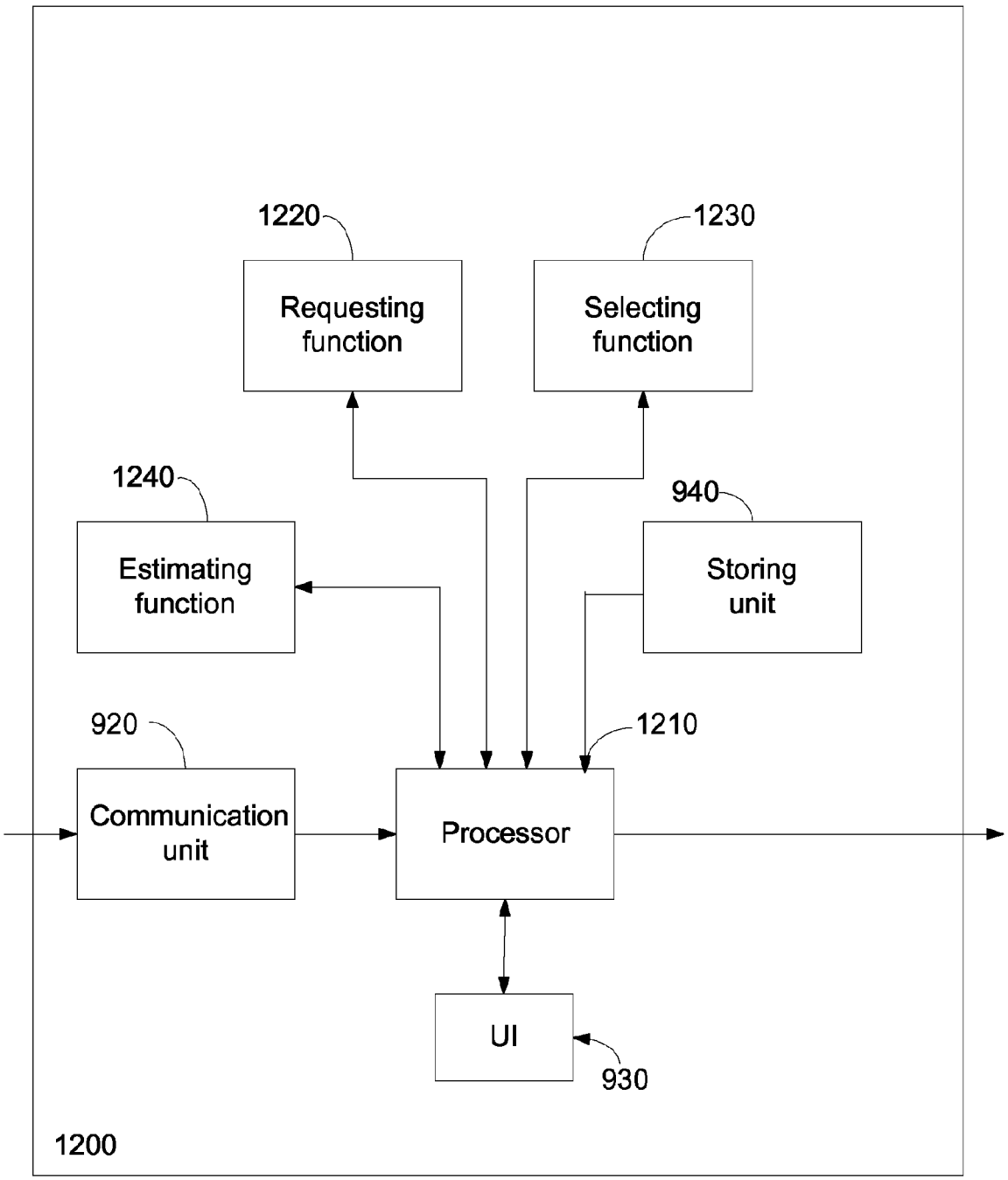
FIG. 12 is a simplified illustration of a client configuration according to another embodiment.
Figure 3:
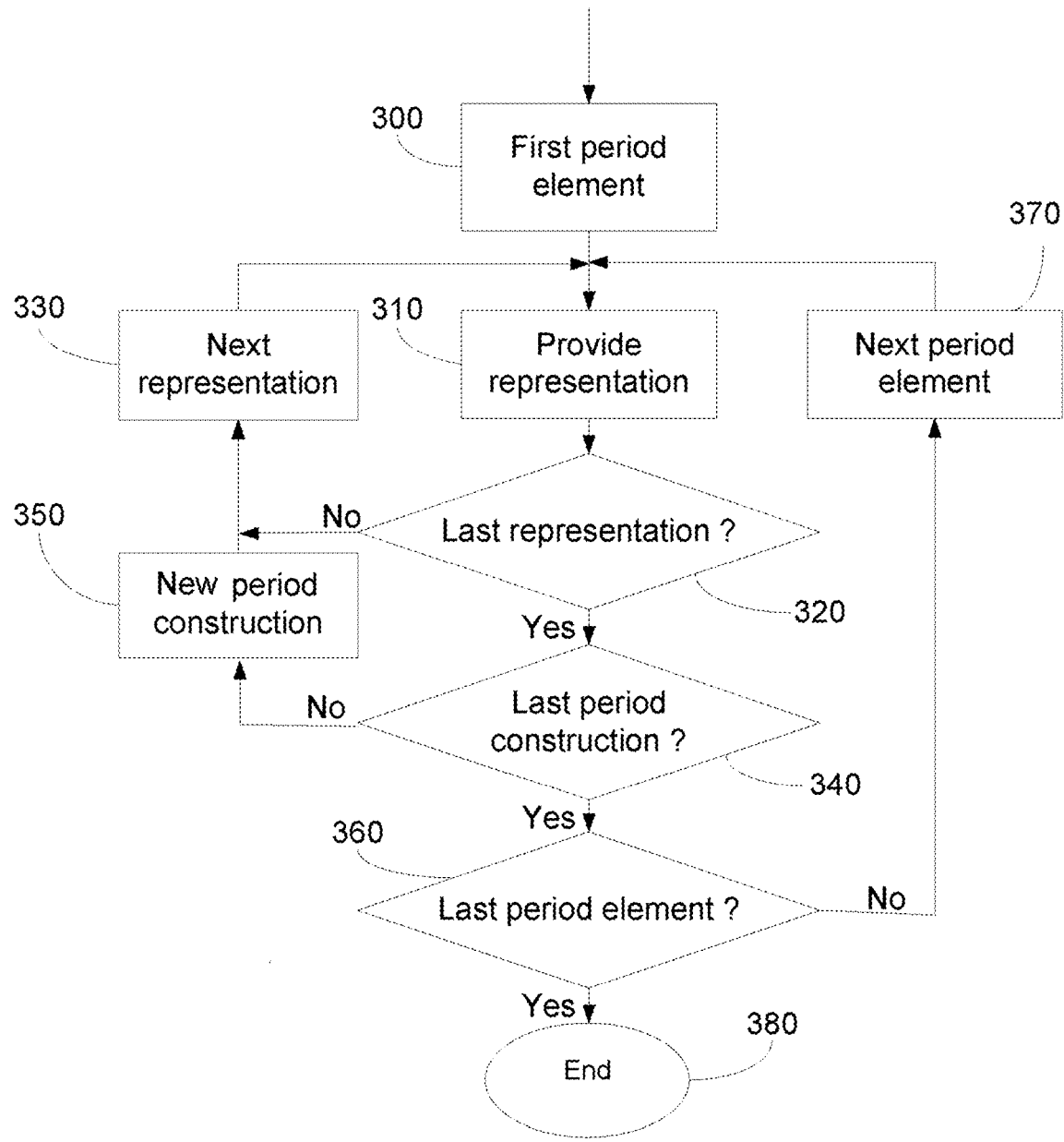

In a corresponding way a software based client 1200 is described below with reference to FIG. 12, where a processor 1210 connected to a communication unit 920 and a storing unit 940 is configured to control, on the basis of instructions contained in the storing unit 940, a requesting function 1220, and a selecting function 1230 to execute functionality which corresponds to what is performed by the respective corresponding requesting unit 910 and selecting unit 950 of FIG. 9.

In addition, the processor 1210 may be configured to control an estimating function 1240 which is configured to execute estimating functionality in a way which corresponds to the functionality of the estimating unit 960 of FIG. 9.

The invention claimed is:

1. A method performed by a network node of a communication network for making a Hypertext Transfer Protocol (HTTP) media stream accessible to a client, the method comprising:
generating, by a network node, a Media Presentation Description that comprises at least two period elements sequentially arranged according to a media play timeline of a media content, at least a first period element of the period elements being provided with at least one representation and at least a second period element of the period elements is provided with at least two alternative representations,
wherein each of the representations is provided with an ordered sequence of at least one media segment Uniform Resource Identifier (URI),
wherein each of the at least one media segment URI references at least one media segment of said HTTP media stream;
wherein each of the at least one representation and the at least two alternative representations includes at least one setting for processing the first period element and the second period element, respectively, and
wherein one of the at least two alternative representations includes at least one setting that differs from the other alternative representation and the at least one representation of the first period element, such that the second period element is configured to provide a segment of the media stream with the at least one setting not supported by the first period element;
providing, by the network node, the Media Presentation Description to the client;
wherein the Media Presentation Description is configured to be updated by the network node.

2. A method according to claim 1, wherein said generating comprises:
arranging at least one of the ordered sequences of at least one media segment URI such that it is provided as at least one of the representations and described in a template format.

3. A method according to claim 1, wherein said generating comprises:
arranging at least one of the representations such that it is provided as an ordered sequence of at least two of the media segment URIs and described in a playlist format.

4. A method according to claim 1, wherein said generating comprises:
providing each representation associated with a same period element with a first representation attribute having a setting which is representative of the media segments referenced in said representation.

5. A method according to claim 4, wherein said generating comprises:
providing each of the period elements with a second representation attribute; and
selecting a setting of the second representation attribute which is common for all media segments associated with said associated period element for each of the second representations attributes, such that it is representative of all representations associated with said period element.

6. A method according to claim 5, wherein each of said representation attributes defines a codec, a bitrate, a resolution and/or a language.

7. A method according to claim 5, wherein generating comprises:
arranging media segments of different representations of the same period element, such that they are time aligned at a start of said period element.

8. A method according to claim 5, wherein said generating comprises:
providing the respective second representation attribute in each representation of a respective period element, such that said second representation attribute is described on a representation level; or
providing a respective second representation attribute in the respective period element, such that said second representation attribute is described on a period element level.

9. A method according to claim 4, wherein said generating comprises:
providing at least one of the period elements of the Media Presentation Description with at least two alternative period constructions, where each period construction is provided with at least two of the representations, and a second representation attribute; and
selecting a setting of the second representation attribute such that it is representative of the respective alternative period construction.

10. A method according to claim 1, further comprising:
updating the Media Presentation Description, by adding at least one of the representations to, by removing at least one of the representations from, or by modifying at least one of the representations of the Media Presentation Description.

11. A method according to claim 10, wherein generating comprises:
providing the Media Presentation Description with an indication of a poll interval.

12. A method according to claim 10, further comprising:
pushing the updated Media Presentation Description to the client.

13. A method according to claim 1, wherein generating comprises:
providing the Media Presentation Description with a description of a mapping of the media play timeline of said HTTP media stream with one of a server time line and a wall clock time.

14. A method performed by a client of a communication network for obtaining a Hypertext Transfer Protocol (HTTP) media stream from at least one network node of the communication network, the method comprising:
acquiring, from one of said at least one network node, a Media Presentation Description comprising at least two period elements, sequentially arranged according to a media play timeline of a media content,
wherein at least a first period element of the period elements comprises at least one representation and wherein at least a second period element of the period elements comprises at least two alternative representations,
wherein each of the representations comprises an ordered sequence of at least one media segment Uniform Resource Identifier (URI),
wherein each of the at least one media segment URI references at least one media segment of said HTTP media stream,
wherein each of the at least one representation and the at least two alternative representations includes at least one setting for processing the first period element and the second period element, respectively, and wherein one of the at least two alternative representations includes at least one setting that differs from the other alternative representation and the at least one representation of the first period element, such that the second period element is configured to provide a segment of the media stream with the at least one setting not supported by the first period element;

selecting for at least one of said period elements, on the basis of content of the Media Presentation Description, one of the representations; and acquiring, for each of the selected representations, referenced media segments associated with the respective representation;

wherein the Media Presentation Description is configured to be updated by the network node.

15. A method according to claim 14, wherein said selecting comprises:

selecting the respective representation on the basis of at least one representation attribute of the respective period element, each of the representation attributes having a respective setting representative of the respective representation.

16. A method according to claim 15, further comprising: estimating a bit rate available for transmitting the HTTP media stream from said at least one network node to the client; and selecting the representation of at least one of the period elements on the basis of said estimation based on one of the at least one representation attribute being a bit rate dependent representation attribute.

17. A method according to claim 15, wherein said selecting comprises:

selecting the respective representation based on at least one client capability.

18. A method according to claim 14, further comprising: polling said network node for Media Presentation Description updates; and acquiring and storing said updated Media Presentation Description when the Media Presentation Description has been updated.

19. A method according to claim 18, wherein said polling is executed according to a polling interval acquired from a previously acquired Media Presentation Description.

20. A method according to claim 14, further comprising: receiving an updated Media Presentation Description in a push notification provided from said at least one network node; and storing said updated Media Presentation Description.

21. A network node of a communication network operable to make a Hypertext Transfer Protocol (HTTP) media stream accessible to a client, the network node comprising:

a generating unit configured to generate a Media Presentation Description, such that it comprises at least two period elements sequentially arranged according to a media play timeline of a media content, at least a first period element of the period elements being provided with at least one representation and at least a second period element of the period elements is provided with at least two alternative representations, wherein each of the representations is provided with an ordered sequence of at least one media segment Uniform Resource Identifier (URI), wherein each of the at least one media segment URI references at least one media segment of said HTTP media stream;

wherein each of the at least one representation and the at least two alternative representations includes at least one setting for processing the first period element and the second period element, respectively, and wherein one of the at least two alternative representations includes at least one setting that differs from the other alternative representation and the at least one representation of the first period element, such that the second period element is configured to provide a segment of the media stream with the at least one setting not supported by the first period element;

a providing unit configured to make the Media Presentation Description accessible to a client;

wherein the Media Presentation Description is configured to be updated by the network node.

22. A network node according to claim 21, wherein the generating unit is further configured to provide the Media Presentation Description with at least one of the representations described in a template format and/or a playlist format.

23. A network node according to claim 21, wherein the generating unit is further configured to provide the Media Presentation Description, for each of the media segment URIs, with an indication of a duration of the respective referenced at least one media segment.

24. A network node according to claim 21, wherein the generating unit is further configured to update the Media Presentation Description, by adding at least one of the representations to, by removing at least one of the representations from, or by modifying at least one of the representations of the Media Presentation Description.

25. A network node according to claim 24, wherein the generating unit is further configured to provide the Media Presentation Description with an indication of a poll interval.

26. A network node according to claim 24, further comprising a communication unit configured to recognize when a Media Presentation Description update has been executed and to push the updated Media Presentation Description to the client.

27. A network node according to claim 21, wherein the generating unit is further configured to provide said Media Presentation Description with a description of a mapping of the media play timeline of said HTTP transport stream with one of a server time line and a wall clock time.

28. A network node according to claim 27, wherein the generating unit is further configured to arrange media segments of different representations of the same period element such that they are time aligned at a start of said period element.

29. A network node according to claim 21, wherein the generating unit is further configured to provide each of the representations associated with a same period element with a representation attribute and a respective representation attribute setting, such that said representations are selectable by said client based on said representation attribute.

30. A network node according to claim 29, wherein the generating unit is further configured to provide at least two different categories of the representation attributes, and to provide said representation attributes in a hierarchical manner, such that when a respective one of the representation attributes is provided at a period level it is valid for all of the representations of a respective one of the period elements, and when a respective one of the representation attributes is provided at a representation level it is only valid for the respective representation of a respective one of the period elements.

31. A client of a communication network operable to acquire a Hypertext Transfer Protocol (HTTP) media stream from at least one network node of the communication network, the client comprising:
  a requesting unit configured to acquire, from one of said at least one network node, a Media Presentation Description comprising at least two period elements sequentially arranged according to a media play timeline of a media content,
  wherein at least a first period element of the period elements comprises at least one representation and wherein at least a second period element of the period elements comprises at least two alternative representations,
  wherein each of the representations comprises an ordered sequence of at least one media segment Uniform Resource Identifier (URI),
  wherein each of the at least one media segment URI references at least one media segment of said HTTP media stream,
  wherein each of the at least one representation and the at least two alternative representations includes at least one setting for processing the first period element and the second period element, respectively, and
  wherein one of the at least two alternative representations includes at least one setting that differs from the other alternative representation and the at least one representation of the first period element, such that the second period element is configured to provide a segment of the media stream with the at least one setting not supported by the first period element;
  a selecting unit configured to select for at least one of said period elements, on the basis of content of said Media Presentation Description, one of the representations;
  wherein the requesting unit is further configured to acquire, for each of the selected representations, referenced media segments associated with the respective representation;
  wherein the Media Presentation Description is configured to be updated by the network node.

32. A client according to claim 31, wherein the selecting unit is further configured to select a respective one of the representations on the basis of at least one representation attribute of said representation; and
  wherein the requesting unit is further configured to acquire at least one of the media segments referenced by the selected representation.

33. A client according to claim 32, further comprising an estimating unit configured to estimate a bit rate available for transmitting the HTTP media stream from said at least one network node to the client; and
  wherein the selecting unit is further configured to select the representation of at least one of the period elements on the basis of said estimation based on at least one of said representation attributes being a bit rate dependent representation attribute.

34. A client according to claim 32, wherein said selecting unit is further configured to select a respective one of the representations based on at least one client capability.

35. A client according to claim 30, wherein the requesting unit is further configured to poll said network node for Media Presentation Description updates, and to acquire an updated Media Presentation Description from said network node when it is determined that the Media Presentation Description has been updated.

36. A client according to claim 35, wherein said requesting unit is configured to poll said network node for the Media Presentation Description updates by applying a polling interval acquired from a previously acquired Media Presentation Description.

37. A client according to claim 31, wherein said requesting unit is configured to receive, from said at least one network node, a push notification comprising an updated Media Presentation Description.

* * * * *

UNITED STATES PATENT AND TRADEMARK OFFICE
CERTIFICATE OF CORRECTION

PATENT NO. : 9,621,610 B2  
APPLICATION NO. : 13/521387  
DATED : April 11, 2017  
INVENTOR(S) : Gabin et al.

It is certified that error appears in the above-identified patent and that said Letters Patent is hereby corrected as shown below:

On the Title Page

Item (74), under "Attorney, Agent, or Firm", in Column 2, delete "Myers Bigel, P.A." and insert -- Sage Patent Group --, therefor.

In the Drawings

Figure 3:
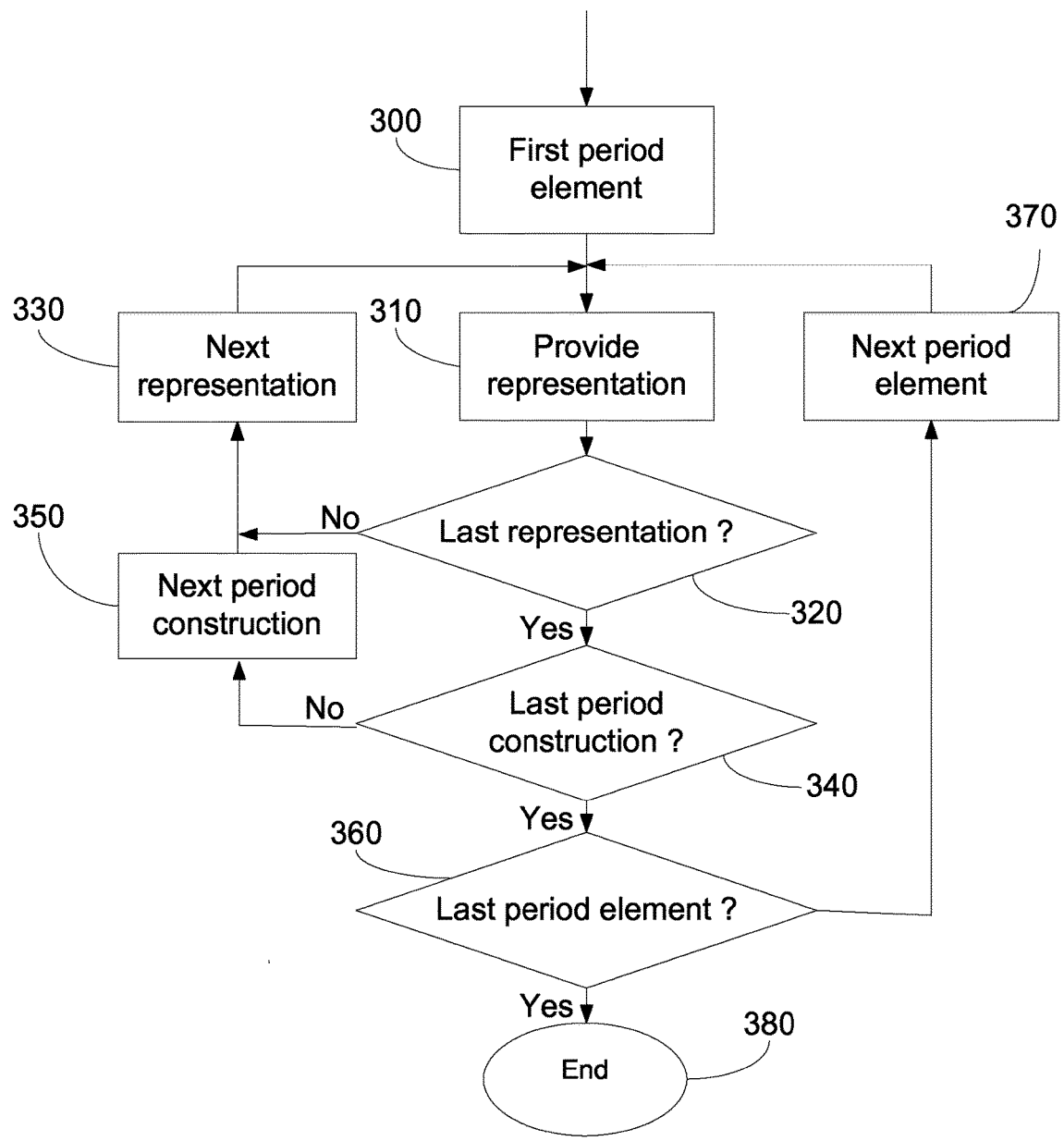
FIG. 3 is another flow chart illustrating the generating process of FIG. 2 in further detail.

Replace Figure 3, Sheet 3 of 11, with the attached Replacement Sheet.

Fig. 3, Sheet 3 of 11, for Step "350", in Line 1, delete "Next" and insert -- New --, therefor.

In the Specification

Column 1, Line 7, delete "δ371" and insert -- §371 --, therefor.

Column 1, Line 55, delete "time 2" and insert -- time 2. --, therefor.

Column 3, Line 13, delete "provide" and insert -- provided --, therefor.

Column 3, Line 59, delete "aMPD" and insert -- a MPD --, therefor.

Column 4, Line 64, delete "FIG. 8a and 8b" and insert -- FIGS. 8a and 8b --, therefor.

Column 5, Line 25, delete "comprise" and insert -- comprises --, therefor.

Column 5, Line 67, delete "URI's" and insert -- URIs --, therefor.

Column 6, Line 1, delete "URI's" and insert -- URIs --, therefor.

Signed and Sealed this  
Third Day of July, 2018

Andrei Iancu  
*Director of the United States Patent and Trademark Office*

Column 6, Line 2, delete "URI's" and insert -- URIs --, therefor.

Column 8, Line 30, delete "FIG. 4" and insert -- FIG. 4, --, therefor.

Column 8, Line 51, delete "step 430" and insert -- step 430, --, therefor.

Column 9, Line 31, delete "MDP," and insert -- MPD, --, therefor.

Column 9, Line 32, delete "step 450" and insert -- step 450, --, therefor.

Column 9, Line 64, delete "FIG. 5" and insert -- FIG. 5, --, therefor.

Column 10, Line 1, delete "Low quality" and insert -- Low Quality --, therefor.

Column 10, Line 40, delete "users preferences," and insert -- user's preferences, --, therefor.

Column 11, Line 49, delete "URI's," and insert -- URIs, --, therefor.

Column 11, Line 65, delete "URI's," and insert -- URIs, --, therefor.

Column 12, Line 3, delete "/$Segmentnumber$" and insert -- /$SegmentNumber$ --, therefor.

Column 14, Line 49, delete "$Segmen$SegmentNumber$"" and insert -- $Segment$SegmentNumber$" --, therefor.

Column 17, Line 55, delete "Period)." and insert -- Protocol). --, therefor.

Column 19, Line 22, delete "MPD's," and insert -- MPDs, --, therefor.

Column 20, Line 53, delete "generating unit 810 of FIG. 8," and insert -- generating unit 910 of FIG. 9, --, therefor.

Column 20, Line 56, delete "FIG. 8." and insert -- FIG. 9. --, therefor.

Column 20, Lines 64-65, delete "requesting unit 910 and selecting unit 950 of FIG. 9." and insert -- requesting unit 1010 and selecting unit 1050 of FIG. 10. --, therefor.

Column 21, Line 2, delete "estimating unit 960 of FIG. 9." and insert -- estimating unit of FIG. 10. --, therefor.

In the Claims

Column 21, Line 22, Claim 1, delete "stream;" and insert -- stream, --, therefor.

Column 23, Line 65, Claim 21, delete "stream;" and insert -- stream, --, therefor.

CERTIFICATE OF CORRECTION (continued)
U.S. Pat. No. 9,621,610 B2

Column 26, Line 21, Claim 35, delete "A client according to claim 30," and insert -- A network node according to claim 30, --, therefor.

Column 26, Line 27, Claim 36, delete "A client according to claim 35," and insert -- A network node according to claim 35, --, therefor.